(12) United States Patent
Cincotti

(10) Patent No.: US 10,330,441 B2
(45) Date of Patent: *Jun. 25, 2019

(54) SYSTEMS AND METHODS FOR CREATING REALISTIC IMMERSIVE TRAINING ENVIRONMENTS AND COMPUTER PROGRAMS FOR FACILITATING THE CREATION OF SAME

(75) Inventor: K. Dominic Cincotti, Wilmington, NC (US)

(73) Assignee: MILITARY WRAPS, INC., Lumberton, NC (US)

( * ) Notice: Subject to any disclaimer, the term of this patent is extended or adjusted under 35 U.S.C. 154(b) by 166 days.

This patent is subject to a terminal disclaimer.

(21) Appl. No.: 12/960,278

(22) Filed: Dec. 3, 2010

(65) Prior Publication Data
US 2012/0166146 A1 Jun. 28, 2012

Related U.S. Application Data

(63) Continuation-in-part of application No. 12/229,047, filed on Aug. 19, 2008, now Pat. No. 8,597,026, and a continuation-in-part of application No. 12/830,179, filed on Jul. 2, 2010, now Pat. No. 8,764,456.

(60) Provisional application No. 61/266,397, filed on Dec. 3, 2009.

(51) Int. Cl.
*F41H 3/00* (2006.01)
*G09B 19/24* (2006.01)
*F41J 11/00* (2009.01)

(52) U.S. Cl.
CPC ............... *F41H 3/00* (2013.01); *F41J 11/00* (2013.01); *G09B 19/24* (2013.01)

(58) Field of Classification Search
USPC .................................................... 434/19–22
See application file for complete search history.

(56) References Cited

U.S. PATENT DOCUMENTS

| 2,616,145 A | 11/1952 | Dufford |
| 3,784,054 A | 1/1974 | Mautz |
| 3,802,098 A | 4/1974 | Sampson et al. |

(Continued)

FOREIGN PATENT DOCUMENTS

| WO | WO 2009/126173 | 10/2009 |
| WO | WO 2011/069112 | 6/2011 |

OTHER PUBLICATIONS

Kobayashi, Y. "Photogrammetry and 3D city modelling." Digital Architecture and Construction. vol. 90. 2006.*

(Continued)

*Primary Examiner* — Robert J Utama
(74) *Attorney, Agent, or Firm* — J. Bennett Mullinax, LLC

(57) ABSTRACT

Systems and methods for creating an immersive training environment for urban operations training that simulates a mission site and related computer program products are provided. Data specific to a mission site to be simulated can be provided. The data can be analyzed to create an accurate depiction of the mission site to be simulated. Visual imagery of one or more structures of the mission site can be generated based on the analysis of the data. One or more structures that have the visual imagery of the mission site to be simulated can be created. Further, the one or more structures can be positioned to provide a physical simulation of the mission site based on the analysis of the data.

12 Claims, 17 Drawing Sheets

(56) References Cited

U.S. PATENT DOCUMENTS

| | | |
|---|---|---|
| 4,001,949 A | 1/1977 | Francis |
| 4,234,911 A | 11/1980 | Faith |
| 4,526,548 A | 7/1985 | Livingston |
| 4,809,470 A | 3/1989 | Bauer et al. |
| 5,203,707 A | 4/1993 | Musto et al. |
| 5,219,316 A | 6/1993 | Huffman |
| 5,226,818 A | 7/1993 | Feiock et al. |
| 5,242,172 A | 9/1993 | Bateman |
| 5,316,484 A | 5/1994 | Layton et al. |
| 5,320,358 A | 6/1994 | Jones |
| 5,496,176 A | 3/1996 | Swanson |
| 5,599,187 A | 2/1997 | Mesiano |
| 5,822,936 A | 10/1998 | Bateman |
| 5,904,410 A | 5/1999 | Davies |
| 5,924,131 A | 7/1999 | Wilkinson |
| 5,951,016 A | 9/1999 | Bateman |
| 6,081,275 A | 6/2000 | Kojima |
| 6,178,713 B1 | 1/2001 | Delie et al. |
| 6,179,620 B1 | 1/2001 | Schmid |
| 6,235,367 B1 | 5/2001 | Holmes et al. |
| 6,257,583 B1 | 7/2001 | Roberson |
| 6,354,212 B1 | 3/2002 | Krinsky |
| 6,497,442 B1 | 12/2002 | Wacker |
| 6,579,097 B1 | 6/2003 | Sampson et al. |
| 6,631,683 B2 | 10/2003 | Krinsky |
| 6,959,646 B2 | 11/2005 | Fujii et al. |
| 7,011,528 B2 | 3/2006 | Tweet et al. |
| 7,074,043 B1 | 7/2006 | Jacobson |
| 7,329,127 B2 | 2/2008 | Kendir et al. |
| 7,922,492 B2 | 4/2011 | Nielsen et al. |
| 8,123,526 B2 | 2/2012 | Hoover et al. |
| 8,597,026 B2 | 12/2013 | Cincotti et al. |
| 2002/0029133 A1 | 3/2002 | Imai |
| 2002/0069078 A1 | 6/2002 | Goldstein |
| 2003/0027103 A1 | 2/2003 | Preston et al. |
| 2003/0227440 A1 | 12/2003 | Fager et al. |
| 2004/0049992 A1 | 3/2004 | Seavy |
| 2004/0196282 A1 | 10/2004 | Oh |
| 2005/0005339 A1* | 1/2005 | Johnson .............................. 2/69 |
| 2005/0071040 A1 | 3/2005 | Kirila |
| 2005/0079330 A1 | 4/2005 | Tanel |
| 2005/0100717 A1 | 5/2005 | Riddle |
| 2005/0128212 A1 | 6/2005 | Edecker et al. |
| 2005/0158101 A1 | 7/2005 | Silverbrook et al. |
| 2005/0200682 A1 | 9/2005 | Silverbrook et al. |
| 2005/0272011 A1 | 12/2005 | Herman et al. |
| 2006/0107985 A1 | 5/2006 | Sovine |
| 2006/0271860 A1 | 11/2006 | Walter |
| 2007/0020585 A1 | 1/2007 | Bjorkman et al. |
| 2007/0113487 A1 | 5/2007 | Warminsky |
| 2007/0117503 A1 | 5/2007 | Warminsky |
| 2007/0118805 A1 | 5/2007 | Kraus et al. |
| 2009/0111073 A1 | 4/2009 | Stanley |
| 2009/0237564 A1 | 9/2009 | Kikinis et al. |
| 2009/0286208 A1 | 11/2009 | Coleman |
| 2010/0013162 A1 | 1/2010 | Wright et al. |
| 2010/0064596 A1 | 3/2010 | Bowsher |
| 2010/0225064 A1 | 9/2010 | Deatherage |
| 2010/0275797 A1 | 11/2010 | Cortina |
| 2011/0035708 A1 | 2/2011 | Damalle |
| 2011/0171623 A1 | 7/2011 | Cincotti et al. |
| 2011/0256511 A1 | 10/2011 | Cragg |
| 2011/0300514 A1 | 12/2011 | Didier et al. |

OTHER PUBLICATIONS

Yusuf, A. "An approach for real world data modelling with the 3D terrestrial laser scanner for built environment" Automation in Construction 16 (2007) 816-829.*

Hakim. "A Mobile System for indoor 3-D mapping and positioning" Optical 3-D measurement techinque 1997.*

Lamothe, Dan, "Training Gets 'Hyper-Realistic'," Marine Corps Times, Nov. 2, 2009.

Meggitt Training Systems Canada Brochure, "Unmanned Target Drone System: Aerial Air-Launched Target Drone," at least as early as Mar. 2012.

Meggitt Training Systems Canada Brochure, "Universal Target Control Station: Multiple Target Command & Control," at least as early as Mar. 2012.

Ad Graphics, Inc. Advertisement, Sign Business Magazine, Nov. 1993.

Photograph of a building in Northern Virginia with graphic artwork applied thereto. This artwork has allegedly been on the building since at least as early as 1993.

Homepage for Ad Graphics website, www.adgraphics.us, Dec. 22, 2008.

Contact and FAQs webpages from Sign Farm website, www.signfarm.com, Dec. 16, 2008.

RAND Corporation, "Preparing for the Proven Inevitable: An Urban Operations Training Strategy for America's Joing Force," 2006, Part 1.

RAND Corporation, "Preparing for the Proven Inevitable: An Urban Operations Training Strategy for America's Joing Force," 2006, Part 2.

RAND Corporation, "Preparing for the Proven Inevitable: An Urban Operations Training Strategy for America's Joing Force," 2006, Part 3.

U.S. Appl. No. 12/229,047.

U.S. Appl. No. 13/998,739.

International Search Report and Written Opinion for PCT/US08/73590 dated Feb. 18, 2009.

International Search Report and Written Opinion for PCT/US 10/58969 dated Mar. 10, 2011.

Berlin Wallpaper—Animals, of the Wild [online]. Jan. 19, 2008 [retrieved on Feb. 3, 2009]. www.berlinwallpaper.com/wallsofthewild/Default.asp>; p. 1.

Chwang, Anna B., "Thin Film Encapsulated Flexible Organic Electroluminescent Displays," Appl. Phys. Lett., vol. 83, 413, Jul. 21, 2003.

Eltron, "Advanced Nano-Phase Materials Promise to Revolutionize Solid State Power Generation, Peltier Heating/Cooling," Eltron Research and Development Tech Brief, 2009.

Florida, R., "Small Science with Big Promise—Nanotechnology Research at NJIT," NJIT Magazine, pp. 14-17, at least as early as Sep. 10, 2008.

Gassler, John Jr.: "Military Wraps: The Next Generation in Combat Training Solutions," Special Operations Report, vol. 16, Sep. 15, 2008.

Greenemeier, Larry:"Sticky Savior: U.S. Army Readies a New Blast-Protection Adhesive . . . " http://www.scientificamerican.com/article.cfm?id=army-polymer-adhesive, Dec. 18, 2008.

"How to Disappear," The Economist Technology Quarterly, Sep. 6, 2008, pp. 21 and 24.

KB Port Simulation Environments[online]. Jan. 25, 2008 [retrieved Jan. 28, 2009]. www.kbport.com/products/pse-main.php?KeepThis=true&TB_iframe=true&width=805>; p. 1-2; Figs. 1-2.

McKee, et al., "Future Combat Vehicle Protected by an Active Camouflage System," Military Technology (Miltech), Jul. 17, 2009.

Moyle, Wendy, Personalized Standees . . . [online] Apr. 10, 2008 [ret. Feb. 3, 2009] http://shindigzparty.wordpress.com/2008/04/10/personalized-standees-and-wall-graphics-for-mothers-day/>.

Navy Press Release No. 597-08, Jul. 15, 2008.

Yusuf, A., "An approach for real world data modelling with the 3D terrestrial laser scanner for built environment" Construction 16 (2007) 816-829.

Hardwick, et al.,"A New Look at the InfantryCompany," Infantry Magazine, Nov.-Dec. 2004.

www.actiontarget.com, Mar.-Apr. 2012.

www.actiontarget.com, Jun. 29, 2010.

Meggitt Training Systems Canada Brochure, Barracuda: Maritime Threat Simulation/Unmanned Operations, at least as early as Mar. 2012.

Meggitt Training Systems Canada Brochure, Badger: A Flexible and Realistic Tank Target, at least as early as Mar. 2012.

Meggitt Training Systems Canada Brochure, Entry Control Point Moving Target, at least as early as Mar. 2012.

(56) References Cited

OTHER PUBLICATIONS

Grossman, Lt. Col. Dave, Evolution of Weaponry, www.killology.com.Weaponry.htm, at least as early as 2006 [retrieved on Apr. 12, 2012].
Geospatial Intelligence,webpage, Wikipedia, free encyclopedia, www.en.wikipedia.org/w/index.php?title=Geospatial_intelligence&oldid=370566203, at least as early as Jun. 28, 2010.
Geospatial Intelligence,webpage, Wikipedia, free encyclopedia, www.en.wikipedia.org/wiki/Geospatial_intelligence, Apr. 12, 2012.
Geospatial Intelligence,webpage, Wikipedia, free encyclopedia, www.en.wikipedia.org/w/index.php?title=Geospatial_intelligence&oldid=230659229, at least as early as Aug. 8, 2012.
Cote, Paul, GIS Manual: Exchanging Data between GIS and CAD Formats, webpage, www.gsd.harvard.edu/gis/manual/cad/index.htm#overview, at least as early as 2010 [ret. Mar. 30, 2012].
Cote, Paul, GIS Manual: Georeferencing Images and CAD Data, webpage, www.gsd.harvard.edu/gis/manual/georeferencing/index.htm, at least as early as 2010 [retrieved Mar. 30, 2012].
Cote, Paul, GIS Manual: Spatial Information in Design Culture, webpage, www.gsd.handard.edu/gis/manual/projection_fundamentals/, at least as early as 2010 [ret. Mar. 30, 2012].
McCarty, Brad, Google Adding Interiors . . . , web mag. article, The Next Web, thenextweb.com/google/2010/04/22/google-adding-store-interiors-street-view/, Apr. 10, 2010 [ret. Mar. 30, 2012].
Meggitt Defense Systems Brochure, GT-400 Glide Target, at least as early as Mar. 2012.
Meggitt Training Systems Canada Brochure, Hammerhead: Maritime Threat Simulation, at least as early as Mar. 2012.
Meggitt Training Systems Canada Brochure, High Speed Inflatable Towed Target (HSITT): Maritime Threat Simulation, at least as early as Mar. 2012.
Koboyashi, Y., "Photogrammetry and 3D city modelling." Digital Architecture and Construction. vol. 90. 2006.
Coxworth, Ben, "Laser Backpack Created for 3D Mapping," web magazine GIZMAG, www.gizmag.com/3d-mapping-laser-backpack/16338/, Sep. 10, 2010 [retrieved on Apr. 12, 2012].
Action Target Brochure, MACTH—Modular Armored Tactical Combat House, at least as early as Jun. 2010.
Meggitt Training Systems Brochures, Stationary Armored Target. Moving Armored Target System, Moving Armored Target, at least as early as Mar. 2012.
Meggitt Training Systems Canada website, www.meggittcanada.com, Mar.-Apr. 2012.
Meggitt Training Systems Brochure, Multi-Function Stationary Infantry Target System (MF-SIT), at least as early as Mar. 2012.
Meggitt Training Systems Brochure, RangeMaster Control System, at least as early as Mar. 2012.
Meggitt Training Systems Brochure, Meggitt SHOTT house (Shoot House for Optimized Tactical Training), at least as early as Mar. 2012.
Meggitt Training Systems Brochure, Stationary Infantry Target System, at least as early as Mar. 2012.
Meggitt Training Systems website, www.meggitttrainingsystems.com, Mar.-Apr. 2012.
Meggitt Training Systems Canada Brochure, Mosquito Unmanned Helicopter Vehicle—Target (UHV-T): Cost-Effective, Subscale Helicopter Threat . . . , at least as early as Mar. 2012.
NTC Acquisition Command—Request for Proposals,Solicitation No. W9124B-08-R-0027, dated Jul. 28, 2008.
Non-final Office Action for U.S. Appl. No. 12/229,047 dated Jun. 11, 2012, 30 pages.
Final Office Action for U.S. Appl. No. 12/229,047 dated Oct. 17, 2012, 20 pages.
Notice of Allowance for U.S. Appl. No. 12/229,047, dated Jul. 30, 2013, 29 pages.
Non-final Office Action for U.S. Appl. No. 12/830,179 dated Jul. 30, 2013, 15 pages.
I/ITSEC Interservice/Industry Training, Simulation & Education Conference Program Guide, Nov. 30-Dec. 3, 2009, part 1 of 4.
I/ITSEC Interservice/Industry Training, Simulation & Education Conference Program Guide, Nov. 30-Dec. 3, 2009, part 2 of 4.
I/ITSEC Interservice/Industry Training, Simulation & Education Conference Program Guide, Nov. 30-Dec. 3, 2009, part 3 of 4.
I/ITSEC Interservice/Industry Training, Simulation & Education Conference Program Guide, Nov. 30-Dec. 3, 2009, part 4 of 4.
Meggitt Training Systems Canada Brochure, "Unmanned Target Drone System: Aerial Radar Sea Skimming Target Drone," at least as early as Mar. 2012.
Meggitt Training Systems Canada Brochure, "Unmanned Target Drone System; Aerial Radar Target Drone DT35," at least as early as Mar. 2012.
RAND Corporation, "Preparing for the Proven Inevitable: An Urban Operations Training Strategy for America's Joing Force," 2006, Part 4.
RAND Corporation, "Preparing for the Proven Inevitable: An Urban Operations Training Strategy for America's Joing Force," 2006, Part 5.
RAND Corporation, "Preparing for the Proven Inevitable: An Urban Operations Training Strategy for America's Joing Force," 2006, Part 6.
(MOUT) Shoothouse Statics, Project Reality website forum thread, realitymod.com/forum/f388-pr-bf2-community-modding/56936-request-mout-shoothouse-statics.html, posted Apr. 1, 2009.
Urban Warfare, webpage, Wikipedia, free encyclopedia, www.en.wikipedia.org/wiki/Urban_warfare, Mar. 30, 2012.
Urban Warfare, webpage, Wikipedia, free encyclopedia, www.en.wikipedia.org/w/index.php?title=Urban_warfare&oldid=370319040, at least as early as Jun. 26, 2010 [ret. on Apr. 12, 2012].
Urban Warfare,webpage, Wikipedia, free encyclopedia, www.en.wikipedia.org/w/index.php?title=Urban_warfare&oldid=229300924, at least as early as Aug. 1, 2008 [ret. on Apr. 12, 2012].
Meggitt Training Systems Canada Brochure, Vindicator II: Realistic, Cost-Effective Threat Simulation, at least as early as Mar. 2012.
Meggitt Training Systems Canada Brochure, Unmanned Target Drone System: Aerial Radar Target Drone DT25R, at least as early as Mar. 2012.
Meggitt Training Systems Canada Brochure, TRX-9 Radar Augmented Towed Target With Microdops Scoring, at least as early as Mar. 2012.
Witte, Tom, "A Survey of 3-D Urban Mapping and Visualization Capabilities," conference paper, The International Society for Phototgrammetry and Remote Sensing Joint Symposia URBAN-URS2005, Mar. 14-16, 2005, Tempe, AZ vol. XXXVI-8/W27, 2005.
Sejnowski, Terry, ask the Brains column, Response to: "Is It True That When We Drive, Walk or Reach, for Something Our Brain Performs Calculations? Is This Ability Learned or Innate?," Scientific American Mind, published by Scieintific American, Inc., Nov./Dec. 2009.
Schuett, Aaron, "Taking Technology to New Heights," webpage article, Moldmaking Technology website, www.moldmakingtechnolgy.com/articles/taking-technology-to-new-heights, posted Nov. 1, 2006 [retrieved on Mar. 30, 2012].
Meggitt Training Systems Canada Brochure, TLX-1 Low Level Height-Keeping Tow Target, at least as early as Mar. 2012.
Meggitt Training Systems Canada Brochure, TDK-39A Aerial Gunnery Tow Target, at least as early as Mar. 2012.
Meggitt Defense Systems Brochure, Model RM-30A1 Reeling Machine—Launcher, at least as early as Mar. 2012.
I/ITSEC Newsletter, Published by NTSA, vol. 8, No. 4, Nov. 2009.
Boessenkool, A., "Lockheed Martin Looks to Nanotechnology," Lockheed Martin, Sep. 12, 2008.
Meggitt Training Systems Canada Brochure, "POP-UP Helicopter Target: Threat Simulation/Unmanned Operations," at least as early as Mar. 2012.
Action Target Brochure, "Control Systems: Target Control Module," at least as early as Jun. 2010.
Meggitt Training Systems Canada Brochure, "Scanning Projectile Impact Evaluation System (SPIES)," at least as early as Mar. 2012.
Geospatial Intelligence, webpage, Wikipedia, free encyclopedia, www.en.wikipedia.org/wiki/Geospatial_intelligence, Jun. 29, 2010.

(56) References Cited

OTHER PUBLICATIONS

Urban Warfare, webpage, Wikipedia, free encyclopedia, www.en.wikipedia.org/wiki/Urban_warfare, Jun. 29, 2010.
Dana et al. "Reflectance and Texture of Real World Surfaces" ACM Transactions on Graphics. vol. 18 No. 1. 1999 p. 1-34.
Non-final Office Action for U.S. Appl. No. 13/998,739 dated Feb. 24, 2014, 37 pages.
Notice of Allowance for U.S. Appl. No. 12/830,179, dated Feb. 27, 2014, 54 pages.
U.S. Appl. No. 12/830,179.

* cited by examiner

SYSTEMS AND METHODS FOR CREATING REALISTIC IMMERSIVE TRAINING ENVIRONMENTS AND COMPUTER PROGRAMS FOR FACILITATING THE CREATION OF SAME

RELATED APPLICATIONS

This application is a continuation-in-part patent application which claims the benefit of the filing date of U.S. patent application Ser. No. 12/229,047, filed Aug. 19, 2008, now U.S. Pat. No. 8,597,026 the disclosure of which is incorporated herein by reference in its entirety. This application is also a continuation-in-part patent application which claims the benefit of the filing date of U.S. patent application Ser. No. 12/830,179, filed Jul. 2, 2010, now U.S. Pat. No. 8,764,456 the disclosure of which is incorporated herein by reference in its entirety. The presently disclosed subject matter further claims the benefit of U.S. Provisional Patent Application Ser. No. 61/266,397, filed Dec. 3, 2009, the disclosure of which is also incorporated herein by reference in its entirety.

TECHNICAL FIELD

Generally, systems for creating training environments and related methods and computer programs are provided. More particularly, methods and systems for realistic immersive training environments that simulate actual locations such as mission sites and computer program products for facilitating the creation of such immersive training environments are provided.

BACKGROUND

As more of the world's population moves into an urban environment, battles that are fought in urban areas will also increase. Therefore, soldiers must train for the possibility of having to enter buildings, positively distinguish between friend or foe, and act accordingly. Such training is also needed for law enforcement as well as private security companies. The current shift in doctrine toward more and better urban training for U.S. military, law enforcement and private security personnel is a direct result of the increase in number of armed conflicts and perceived threats in urban environments.

Urban combat is very different from combat in the open at both the operational and tactical level. Complicating factors in urban warfare are the presence of civilians and buildings of all sorts. Some civilians may be difficult to distinguish from combatants such as armed militias and gangs, particularly if individuals are trying to protect their homes. Tactics are complicated by a three-dimensional environment, limited field of view and field of fire because of buildings, enhanced concealment and cover for defenders, below ground infrastructure, and the ease of placement of booby traps and snipers.

Detailed planning is essential. Ideally, the leader of an assault team gathers all available intelligence about the crisis scene, targets, and innocents. The leader diagrams and discusses the proposed plan, outlining each of the team's actions and responsibilities, location, fields of fire, and special tasks (even to the point of a wall-by-wall and door-by-door layout of the objective, where available). Since the assault team usually already has specialized training, the operation is based on well-understood, pre-established standing operating procedure. When considerable preparation time is available, the team sometimes conducts step-by-step walk-through exercises on a mock-up that attempts to duplicate the target environment. Some units maintain permanent "shoot houses" or even airliner/ship mock-ups for providing more realistic practice for marksmanship and tactics.

One of the most dramatic examples of the value and power of this modern, psychological revolution in training can be seen in observations of the 1982 Falklands War. The superbly trained (i.e., "conditioned") British forces were without air or artillery superiority and consistently outnumbered 3-to-1 while attacking the poorly trained but well-equipped and carefully dug-in Argentine defenders. Superior British firing rates (which were estimated to be well over 90%), resulting from modern training techniques, have been credited as a key factor in the series of British victories in that brief but bloody war. Any future army that attempts to go into battle without similar psychological preparation is likely to meet a fate similar to that of the Argentines. Combat veterans and tactical trainers understand that the human mind and body have predictable responses to surprise and lethal threats.

To give a further historical perspective, the U.S. Army greatly improved its firing rates between World War II and Vietnam using conditioning training. By 1946, it was estimated that the U.S. Army had a firing rate during World War II of 15-20% among American riflemen. The Human Resources Research Office of the U.S. Army subsequently pioneered a revolution in combat training that replaced the old method of firing at bulls-eye targets with that of deeply ingrained "conditioning" using realistic, human-shaped pop-up targets that fall when hit. Psychologists know that this kind of realistic powerful "operational conditioning" is the only technique that reliably influences the primitive, mid-brain processing of a frightened human being. Just as fire drills condition terrified school children to respond properly during a fire and repetitious "stimulus-response conditioning" in flight simulators enables frightened pilots to respond reflexively to emergency situations, the introduction of operational conditioning in modern combat training began to yield real results. The application and perfection of these basic conditioning techniques appear to have increased the rate of fire from near 20% in World War II to approximately 55% in Korea and around 95% in Vietnam. Similar high rates of fire resulting from modern conditioning techniques can be seen in FBI data on law enforcement firing rates since the nationwide introduction of these modern conditioning techniques in the late 1960s.

It is a requisite that a soldier train as he will fight. While modern operational urban training involves ballistic shoot house buildings that can be modified structurally (to include a wall, doorway, or staircase), or by situational placement singularly or collectively, there does not exist a practical means for providing a detailed immersive scenario system that allows for accurate re-creation of situational realism and reconfiguration to handle the multiple training scenarios required for modern operational urban training. Currently, shoot houses and other training structures have only rudimentary details besides physical architecture to immerse the trainee into the scenario. These structures are often blank walled or single tone in appearance with little resemblance in terms of visual detail to what will be found at the actual mission site, or in real life.

Training techniques and tools have evolved to keep pace with these new conflicts and threats. Urban operations training based on more realistic visual details and operational conditioning filter visual details and clues to make situationally-based tactical judgments. Among these are "friend or foe" targets and 360 degree simunition and live-fire shoot houses made of ballistic walls. These shoot houses with pop up and moving type targets have been made portable, reconfigurable, and collectively situated for multi-building or simulated city street training. In this field, entry, spotting and time-to-fire decisions are made in seconds. Thus, the judgments are intended to be based on visual details the trainee is deliberately looking for.

For these reasons, shoot houses and facilities are not as effective as they could be for preparing the trainee for filtering the plethora of visual details to make tactical judgments because not enough of the realistic visual details are included.

SUMMARY

It is an object of the presently disclosed subject matter to provide methods and systems for simulating an actual location to provide immersive training environments. More particularly, methods and systems for replicating an actual location for modern urban operations training environments and computer program products for facilitating the creation of such immersive training environments are provided.

The subject matter described herein for facilitating the creation of immersive training environments may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1A:
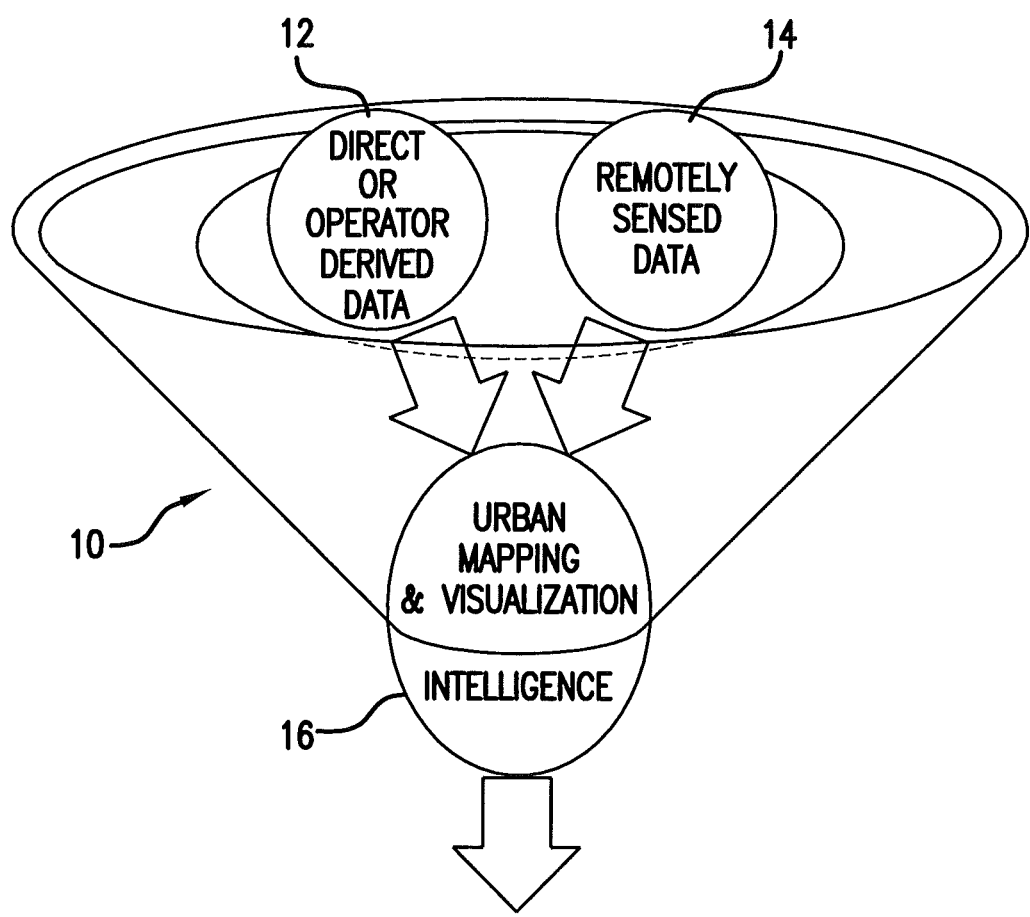
FIG. 1A illustrates a simple schematic diagram of a processor to generate geospatial intelligence for use in creating a simulated structure according to the present subject matter.

Reference will now be made in detail to the description of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

"Physical simulated structure" as used herein means a structure including, but not limited to a shoot house, a modern operational urban training house, a MATCH house, an urban operation or close quarters combat training facility, that accurately re-creates situational realism with realistic visual and/or textural characteristics based on site-specific data collected about a mission site.

"Virtual simulated structure" as used herein means a computer generated three-dimensional structure created on a computer readable medium that is generated based on site-specific data collected about a mission site.

"Physical simulation" as used herein means a selected location or area that is manufactured to accurately re-create situational realism with realistic visual and/or textural characteristics based on site-specific data collected about a mission site.

"Virtual simulation" as used herein means a computer generated three-dimensional layout, or model, of a mission site created on a computer readable medium that is generated based on site-specific data collected about a mission site.

"Site-specific" as used herein means a specific location or article such as a specific building, facility or other structure or physical item, or the architectural or structural characteristics of buildings, facilities or other structures or physical items which would be found in the intended operating environment of a mission site or a mission scenario.

"Image-editing program" as used herein means a computer program used to edit or change an image. Examples include Adobe PHOTOSHOP®, PAINT.NET® and PICASA®.

"Image" as used herein means the optical counterpart of an object or environment produced by graphical drawing by a person, a device (such as a computer) or a combination thereof. The optical counterpart of the object can also be produced by an optical device, electromechanical device, or electronic device. As used herein, "image" can be used to refer to a whole image, for example, a photographic image as taken by a photographic device, or a portion thereof.

"Visual Imagery" as used herein can mean an image or visual depiction of an object or thing that can be measured and/or manipulated on a data processor such as a computer or the like.

"Textural Imagery" as used herein can mean the dimensions and tactical characteristics of an object or thing based on observation of the object or thing that can be measured and/or manipulated on a data processor such as a computer or the like.

"First responder" as used herein means persons or organizations that can be the first medically-trained responders to arrive on scene of an emergency, accident, natural or human-made disaster, or similar event. Examples of such responders can include, but are not limited to, police or other law enforcement, firefighters, emergency medical services, or the like.

"Mission" as used herein means any long term or short term plan for military, law enforcement, or other first responder personnel that defines goals and objectives to be reached by the personnel during a definite or indefinite time period. The term "mission" as used herein can also include, but is not limited to, training for common events that military, law enforcement, or other first responder personnel may encounter during the course of their duties.

"Mission site" as used herein means the location or region where a mission is to be carried out.

"Mission scenario" as used herein means the circumstances surrounding a mission that is to be carried out or training for common events that military, law enforcement, or other first responder personnel may encounter during the course of their duties.

Realistic immersive training environments are needed to increase the effectiveness of the training to be received within those environments. The realistic immersive training environments can accurately replicate or simulate mission sites to provide training on mission scenarios that are expected to be encountered on a mission. Such realistic immersive training environments give trainees a chance to experience situations expected on a mission in a manner that feels real to the trainees before they are actually deployed on the mission. Training in such training environments allow the trainee to react to the needs of the mission instead of too deeply thinking about the situations they find themselves in during a mission.

In order to create such realistic immersive training environments, information is needed on the actual location, or mission site, to accurately replicate or simulate the mission site. The information on the mission site needs to be processed to provide the necessary details to make trainees truly feel like they are at the mission site during their training. The training environment should provide accurate three-dimensional positioning of structures and other environmental markings that accurately simulate the mission site. Thus, information on the mission site should be collected and processed to create the realistic training environment.

FIG. 1A show a simple schematic of a data collection and manipulation process 10. Data collection and manipulation process 10 can be used to transform raw data that is site-specific about a mission site into urban mapping and visualization intelligence 16. The site-specific data that is provided for data collection and manipulation process 10 can derive from such sources as, for example, direct or operator derived site-specific data 12 and remotely captured site-specific data 14.

Direct or operator derived site-specific data 12 can comprise, for example, information collected by field agents using image capturing devices, such as video or digital cameras, radar, light detection and ranging devices ("LIDAR"), sonar, global positioning system devices ("GPS"), differential global positioning system devices ("DGPS") or the like that can be used directly by an operator. Direct or operator derived data 12 can also comprise operator input about and/or descriptions of a location such as the spatial relationship of key sites at the location or mission site, the surrounding terrain, building exterior and/or interior information or the like that can be entered into a data processor or data collection apparatus. Such direct or operator derived data 12 can help provide further details that can be used to determine the physical appearance of a mission site to be used.

Figure 2A:
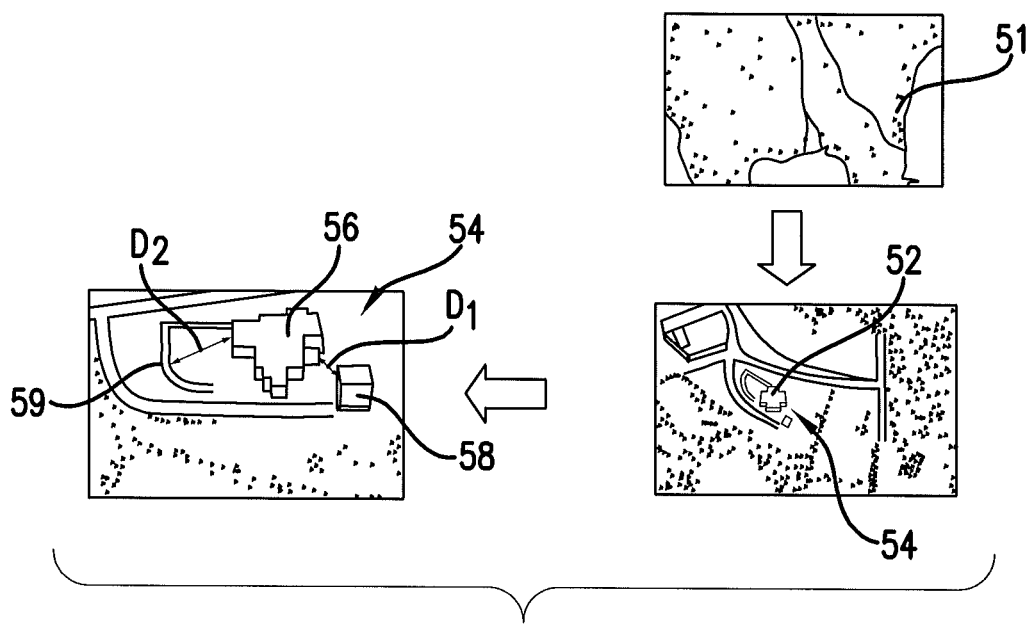
FIG. 2A illustrates embodiments of different site-specific data that can be collected by a data collection apparatus according to the present subject matter.

Remotely captured site-specific data 14 can comprise, for example, satellite collected information, sensing and/or image capturing devices that can be remotely controlled, sensing and/or image capturing devices that can be automatically operated, or the like. For example, satellite collected information can include satellite images and data collected by a satellite that provide geospatial information and location imagery. For example as shown in FIG. 2A, a satellite can, for example, identify the land mass 51 then zoom in to identify, measure and depict a region 52 in which the mission site 54 resolves. Further, a satellite can provide visual imagery and other positioning information on structures 56, 58 at the mission site such as mission site layout measurements like distance D1 between the structures and the distance D2 between road 59 and structure 56. Also, the layout and other visual detailed can be determined by such satellite images, for example.

Sensing and/or image capturing devices that can be remotely controlled can include such devices that can be controlled by an operator at, a site that is remote from the actual location, or mission site that is being observed or measured. These remotely controlled sensing devices or image capturing devices can be located in a stationary position or can be part of a mobile unit. For example, sensing devices or image capturing devices can be secured to drones, robots, or other unmanned aerial and earthbound vehicles or the like. The controller for such unmanned vehicles can also control the image capturing device or other sensing device that is used to collect information. Sensing and/or image capturing devices that can be automatically operated can include devices that are activated by sensor to start recording information. For example, digital cameras that are activated by thermal levels or by light levels to capture an image or video.

Both the direct or operator derived data 12 and the remotely captured data 14 can be received by a data collection apparatus. A data collection apparatus can be a wide range of devices or apparatuses. For example, the data collection apparatuses can be cameras, thermal readers, surveying instrumentation, or the like. Additionally, for the direct or operator derived data 12, the data collection apparatus can be a personal or network computer into which site-specific data such as eyewitness descriptions of a location can be manually entered.

Figure 1B:
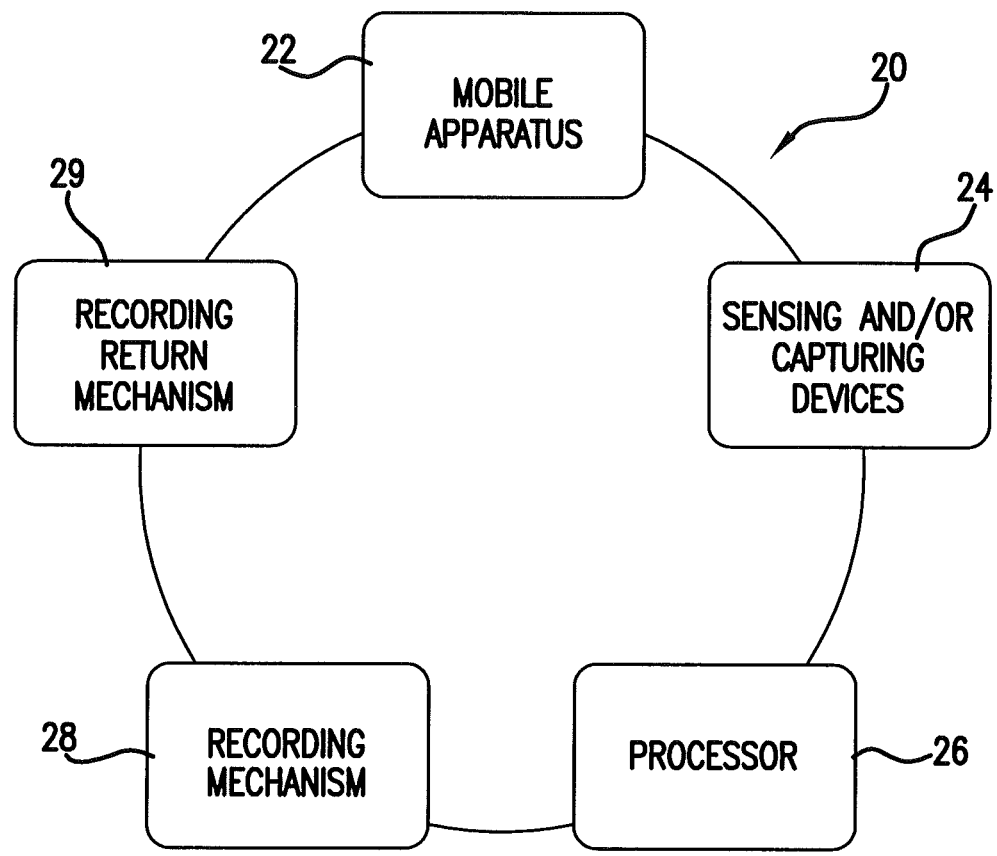
FIG. 1B illustrates a simple schematic diagram of components of an embodiment of a data collection apparatus according to the present subject matter.

FIG. 1B illustrates examples of components of other data collection apparatuses that can be used to collect remotely captured data 14 (see FIG. 1A). For example, a data collection apparatus, generally designated, 20 can be used to collect remotely captured data 14 on the move. Data collection apparatus 20 can include mobile apparatuses 22, sensing and/or image capturing devices 24, signal processors 26, a recording mechanism 28 and/or a recording return mechanism 29. Mobile apparatus 22 can be the apparatus that permits the site-specific data to be collected remotely. For example, the mobile apparatus 22 can be manned aircraft, an unmanned aircraft such as an aerial drone, manned vehicles or unmanned earthbound vehicle, such as a mobile robot.

The mobile apparatus can have one or more sensing and/or image capturing devices 24. Sensing and/or image capturing devices 24 are the actual devices that take measures of some sort or capture images of some sort. For example, the sensing and/or image capturing devices can include video cameras, digital still cameras, sonar, radar, LIDAR synthetic-aperture radar, multi-spectral imaging, hyper-spectral imaging, full-spectral imaging, foliage penetration radar, electro-optic infrared, GPS, DGPS, or the like.

The data collection apparatus 20 can be configured to include a processor 26 to process the signals or other data generated by the one or more sensing and/or image capturing devices 24 to turn this raw site-specific data into useful data/information. The data collection apparatus 20 can further include a recording mechanism 28 that records the useful data/information generated by processor 26. For example, the recording mechanism can store useful data/information for later transmission to a data collection center. For example, data collection apparatus 20 can include a recording return mechanism that transmits the recorded useful data/information to such a data collection center while the data collection apparatus 20 is still out in the field. Alternatively, the recorded useful data/information can be obtained upon the return of the mobile apparatus to its home base.

The raw direct or operator derived data 12 and/or the remotely sensed data 14 that represents geospatial intelligence can be analyzed, edited and organized in data collection and manipulation process 10 to provide urban mapping and visualization intelligence 16 about the mission site that is to be replicated as shown in FIG. 1A. Urban mapping and visualization intelligence 16 can then be used to provide visual and/or textural imagery that can be used to create structures and create a layout of a plurality of such structures that replicates or simulates the geospatial relationships of buildings in the mission site for the intended urban operations.

Figure 1C:
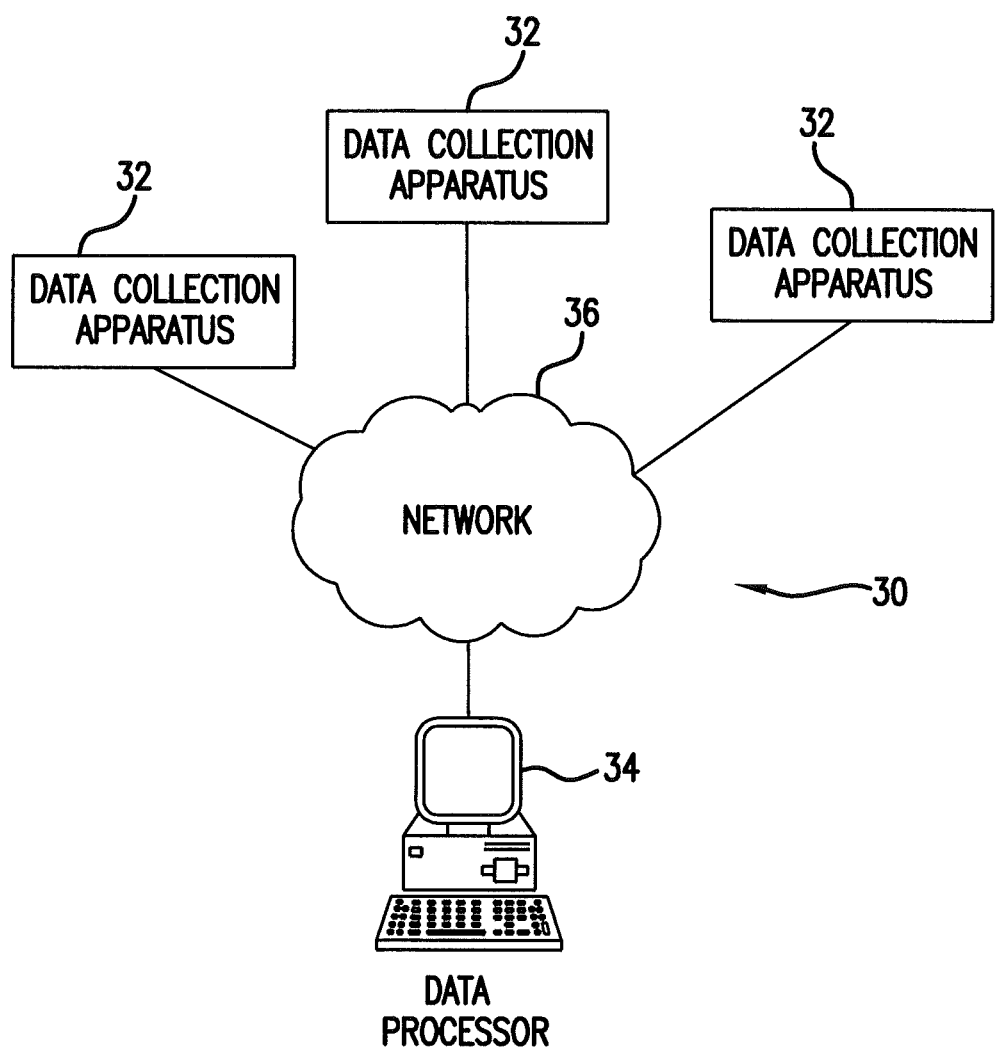
FIG. 1C illustrates a simple schematic diagram of portions of an embodiment of a system that can be used to create a three-dimensional simulated depiction of a mission site according to the present subject matter.

FIG. 1C illustrates a system, generally designated, 30 for three-dimensional virtual simulations of the mission site that can provide an accurate depiction of the mission site before construction of the realistic immersive training environment to ensure accuracy in the positioning, dimensions, and visual and textural imagery of the structures at the mission site. Site-specific data can be collected using the data collection apparatuses 32. As stated above, the data collection apparatuses 32 can be a wide range of devices such as cameras, sensors, mobile apparatuses with sensing and/or image capturing devices, computers where data can be downloaded or entered, or the like. The site-specific data that is collected can come from a variety of different sources and be in different forms as stated above. This site-specific data can be downloaded or entered into a data processor 34. In the embodiment shown in FIG. 1C, the data collection apparatuses 32 can send the collected data over a network 36 to the data processor 34. Such a network 36 can be wireless or can be a wired. Alternatively, the information collected by the data collection apparatuses 32 can be downloaded in a drive of the data processor 34. The data processor 34 which can be, for example, a general, or personal, computer, can be used to edit, organize, and analyze the data received.

The data processor 34 can have a computer program that serves as an application that can perform the tasks outlined herein. For example, the data processor 34 can comprise a non-transitory computer readable medium for facilitating the creation of an immersive training environment for urban operations training that simulates a mission site. The non-transitory computer readable medium comprises computer executable instructions embodied in a non-transitory computer readable medium and when executed by a processor of a computer performs. The non-transitory computer readable medium can perform the steps of receiving collected site-specific data specific to a mission site to be simulated and analyzing the site-specific data to create an accurate depiction of the mission site to be simulated. The non-transitory computer readable medium can also generate visual imagery of one or more structures of the mission site based on the analysis of the site-specific data and calculate positioning of the one or more structures to provide a physical simulation of the mission site based on the analysis of the site-specific data. The non-transitory computer readable medium can create the accurate depictions of the mission site to be simulated and the accuracy of the visual imagery based on a redundancy of data found in the data collected and analyzed. The step of generating accurate visual imagery of the structure to be simulated can further comprise enhancing one or more photographic images to ensure proper details, scale, and perspective. Additionally, the step of generating accurate visual imagery of the structure to be simulated can comprise identifying measurements of an interior or exterior outer surface of the structure at a mission site to be simulated. The non-transitory computer readable medium also can comprise generating a three-dimensional virtual simulation of the mission site based on the collected site-specific data.

Figure 2B:
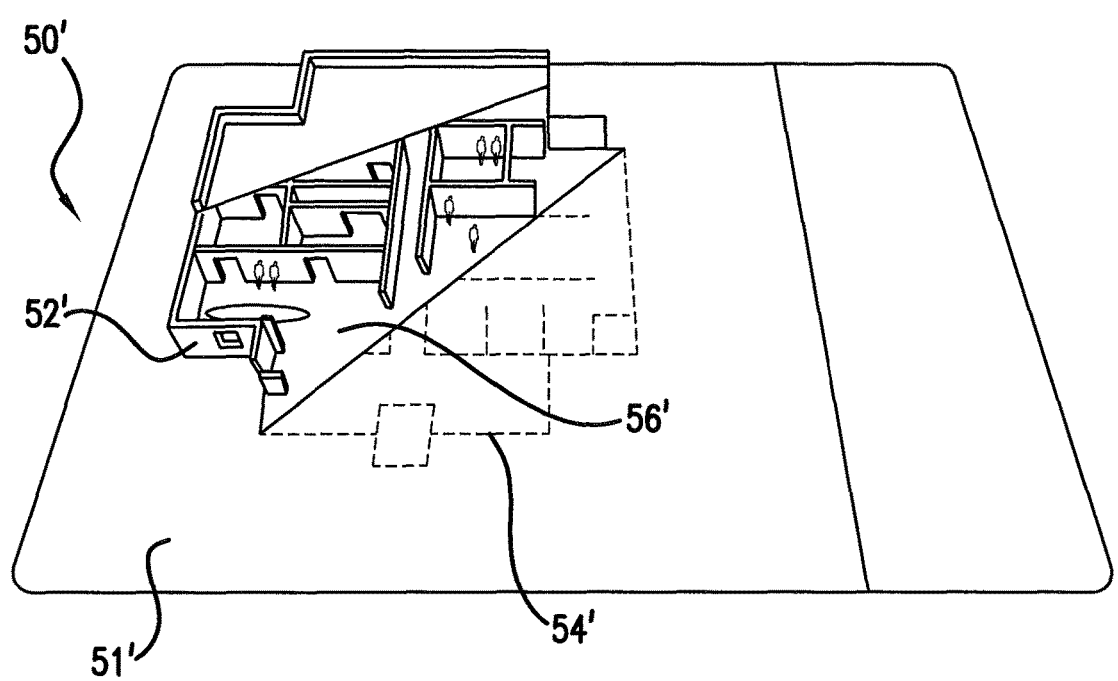
FIG. 2B illustrates an embodiment of a three-dimensional virtual simulation generated by a data processor according to the present subject matter.

The site-specific data can be used to create the most accurate three-dimensional depiction or simulation of the one or more structures and/or the area layout for the location of the mission site for the mission for which the training is occurring. For example, as shown in FIG. 2B, a computer generated three-dimensional virtual simulation 50' of a mission site 51' can be provided. In the embodiment shown, the three-dimensional virtual simulation 50' comprises a three-dimensional structure 56' with a floor plan 54' and walls 52' along with other features with the structure 56'. Once the three-dimensional depiction is created that is satisfactory to the designer, the data processor can then be used to generate accurate textural imagery and visual imagery of the structure to be simulated based on the analysis of the site-specific data. The accurate three-dimensional depictions of the structure to be simulated and the accuracy of the textural and visual imagery created are based on a redundancy of data found in the site-specific data collected and analyzed. This means that from all the different sources of information provided to the data processor in different measurement forms when a measurement result reoccurs repeatedly in different forms, then the measurement is figured to be more accurate. So, measurement results can possibly be heavily relied on to create an accurate depiction and accurate textural imagery and visual imagery. Once the mission site is accurately virtually simulated on the computer, structures can be created and positioned relative to one another to physically simulate the mission site in an accurate manner to create a realistic training environment. Examples of structures that can be used to simulate the actual structures of the mission site are described in more detail below.

The data collection apparatuses 32 can thereby collect different information on the mission site and provide that information to the data processor 34. The site-specific data can then be analyzed by the data processor 34 to create an accurate depiction of the mission site to be simulated. The accurate depiction can be generated based on a redundancy of data found in the data collected and analyzed. In this manner an accurate three-dimensional depiction can be created. Further, visual imagery and/or textural imagery of any structures of the mission site can be generated based on the analysis of the site-specific data by the data processor 34. The visual and/or textural imagery can then be used as explained below to facilitate the creation of one or more structures of the mission site to be simulated with the one or more structures being positioned relative to one another and/or other features of the mission site to simulate the mission site based on the analysis of the data.

The creation of a realistic immersive training environment that simulates or replicates a mission site can be facilitated utilizing geospatial intelligence to accurately calculate physical measurements of the buildings, structures, objects. Moreover, geo-specific media, especially photography/video of the original environment can provide useful information to provide advance positioning information, hereinafter referred to as "advanced geo-tagging."

Example of how the geospatial intelligence and other site-specific data that is collected, by the data collection apparatuses or collected in other manners can be used and fused together. For example, measurements taken by LIDAR, GPS/DGPS, Light/Sound Measurements, High Dynamic Range Photography and Photogrammetry in a mobile platform can be used to scan/photograph interior and exterior building structure environment views for the purpose of creating a coordinated full scale immersive replicated environment. These measurement systems are examples of measurement systems that can be fused or into combined into a single device and/or system that is referred to herein as a "fused geospatial intelligence system." Such a fused geospatial intelligence system can be used to produce both photo-textures for the purpose of improved realism of three-dimensional virtual simulations and full scale site-specific photographic printing that can be applied to full scale structures to create both interior and exterior immersive environments.

The data processor can be combined with the data collection apparatus to comprise a mobile device, such as a handheld device or a device that can be carried by a person, who can provide mobile three-dimensional mapping in a computer readable medium. The mobile device can comprise at least one of LIDAR and/or GPS, cameras, laser range finders, or inertial measurement units to provide advanced geo-tagging of images and scale accurate information for the purpose of full-scale simulation or replication of a mission site to create a realistic immersive training environment.

DGPS/GPS and LIDAR can be used to precisely coordinate the geolocation of a structure. LIDAR cloud points can be used to indicate precise dimensional measurements of interior and exterior areas of a structure. Three-dimensional photography, which can be expressed through geo-tags, can be used to lock locations to specific photoreference points in the system on in a computer program executable by a data processor.

"Geo-skins" as used herein are examples of advanced geo-tagging of photographic images for the purpose of placement onto 3D simulated structures that are based on geo-specific, real world locations. Geo-Tagged Photo-Skins contain, not only conventional geo-tagged data (GPS longitude and latitude), but crucial measurement data of an object(s) or structure(s) in the picture and their relationships. For instance, the measurement of distance and position of photographer or camera with regard to the object or structure in the picture can also be in this enhanced geo-tag. A photo-referencing scale can also be an enhanced geo-tag component, which in turn, can be used to determine actual physical-size dimensions of objects in the photo. Rotational data derived from inertial sensors in a mobile device like the iPhone 4's accelerometer and gyroscope can be contained in geo-tags producing precisely geo-locatable 360 degree panoramic interior views of buildings. Using these systems and methods, user-generated 360 degree panoramic views of both inaccessible street view areas and also interior views are possible. In this way, geolocation, LIDAR and photo-textures become geo-skins precisely aligning scale photography to geolocation (DGPS/GPS) and interior and exterior dimension LIDAR. The full scale replicated environment is built using inexpensive dimensional materials that can display these geo-specific full scale geo-skins. These geo-skins can be projected or printed onto wrapping material panels.

Figure 1D:
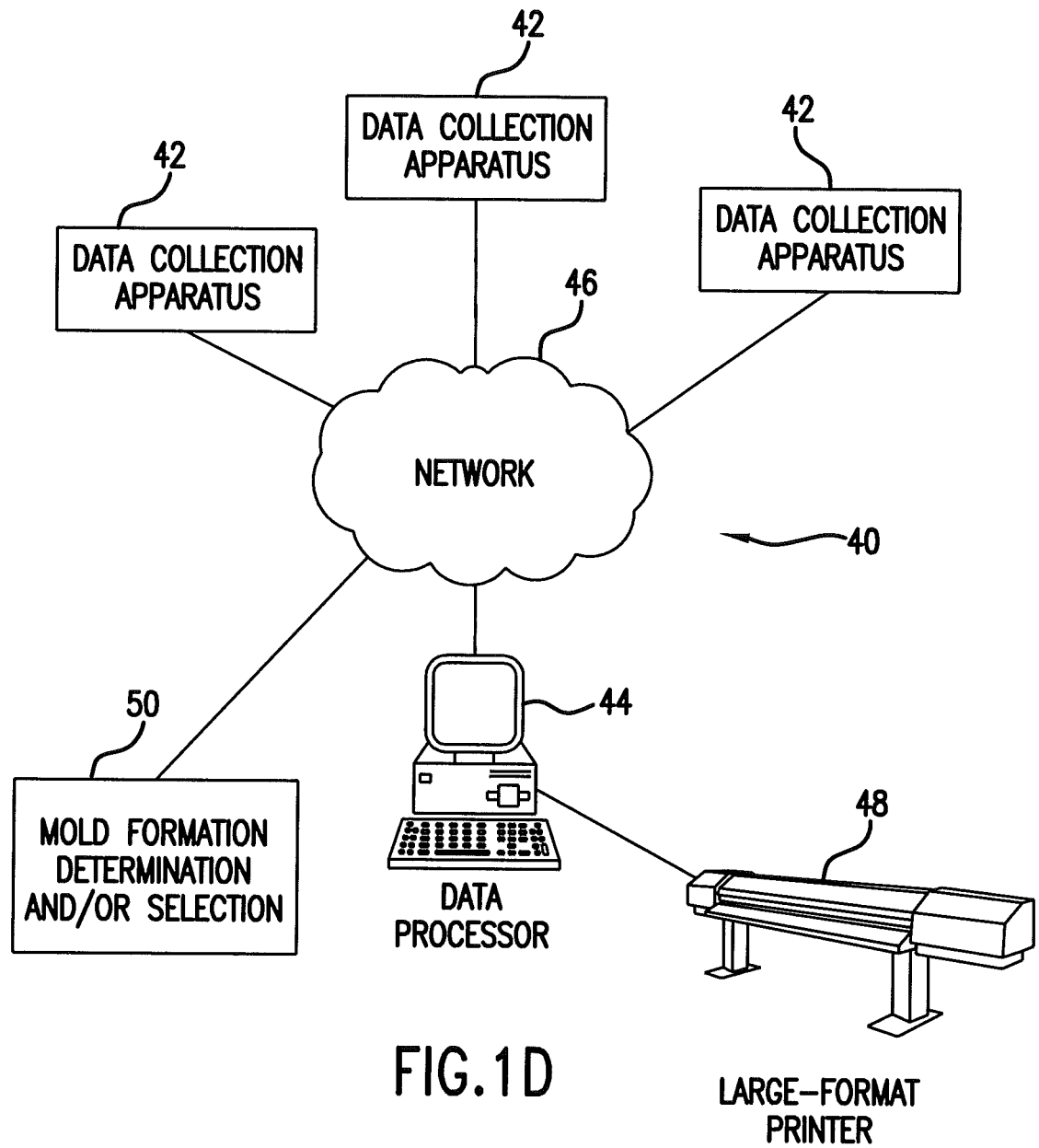
FIG. 1D illustrates a simple schematic diagram of portions of an embodiment of a system that can be used in replicating a structure to be simulated according to the present subject matter.

FIG. 1D illustrates a similar system as depicted in FIG. 1C. In FIG. 1D, a facade creation system, generally designated, 40 is provided for creating visual and/or textural imagery for the structures such as walls and/or buildings. As with the system 30 for three-dimensional virtual simulations of the mission site shown in FIG. 1C, site-specific data can be collected using the data collection apparatuses 42. As stated above, the data collection apparatuses 42 can be a wide range of devices such as cameras, sensors, mobile apparatuses with sensing and/or image capturing devices, computers where data can be downloaded or entered, or the like. The site-specific data that is collected can come from a variety of different sources and be in different forms as stated above. This data can be downloaded or entered into a data processor 44. The information collected by the data collection apparatuses 42 can be manually downloaded in a drive of the data processor 44 and/or the data collection apparatuses 42 can send the collected data over a network 46 to the data processor 44 as shown in the embodiment in FIG. 1D. Such a network 46 can be wireless or can be a wired. The data processor 44 can be used to edit, organize, and analyze the data received to create an accurate three-dimensional depiction of a mission site that is to be simulated. The data processor 44 can have a computer program as outlined above that serves as an application that can perform the tasks outlined herein.

As above, the site-specific data can be used to create the most accurate three-dimensional depiction or replicate of the one or more structures and/or the area layout for the location of the mission site for the mission for which the training is occurring. The data processor can then be used to generate accurate textural imagery and visual imagery of the structure to be simulated based on the analysis of the data. The accurate three-dimensional depictions of the structure to be simulated and the accuracy of the textural and visual imagery created are based on a redundancy of data found in the site-specific data collected and analyzed. This means that from all the different sources of information provided to the data processor in different measurement forms when a measurement result keep reoccurring in different forms, then the measurement is figured to be more accurate. Show measurement result can possibly be heavily relied on to create an accurate depiction and accurate textural imagery and visual imagery.

Physical simulated structures that accurate depict the dimensions of the structures at the mission site can be created based on the three-dimensional computer simulations created by the data processor 44. For each physical simulated structure, the data can be analyzed and manipulated to create a more accurate image of each side of the structure to be applied to a simulated physical structure. For example, instructions can be generated on how to add texture and paint the physical simulated structures. Alternatively, as shown in FIG. 1D, an image of a front of a building can be manipulated to permit the image to be divided into sections and fit to a size for printing onto a wrapping material on a large-format printer 48. The image can also be manipulated to better fit the underlying physical construct of the structure being covered. Once the images to be printed are determined, they can be sent to the printer 48 to be printed. For example, the data processor 44 can be linked to the printer directly or via a wireless or wired network. Alternatively, the image or images can be stored on a portable drive that can be inserted into the printer 48 to download the image for printing.

Once the wrapping material has the visual imagery of the structure at the mission site to be simulated printed thereon, the wrapping material can then be applied to the physical simulated structure to provide the visual imagery on the physical simulated structure to more completely provide a realistic training environment.

Alternatively, as shown in FIG. 1D, the texture or shape of the structure at the mission site to be replicated or simulated can be analyzed once the images to be printed are determined. Thus, the texture or shape of the physical simulated structure on which the wrapping material with the printed image will be applied can be determined or selected as represented by box 50. To apply the texture as with the image, the image of the structure at the mission site can be segmented so that one or more textured wall segments can be created for each physical simulated structure. The texture or shape of the textured wall segments can generally correspond to the image to be printed on the sheets of wrapping material. For example, with an image of a stone wall, the shape of the stones in the textured wall segments being molded should generally be aligned with the image of corresponding stones in the image.

To create a textured wall segment, a mold can be used as disclosed in U.S. patent application Ser. No. 12/830,179, the description of which is incorporated herein by reference. In some cases existing molds may be close enough in texture and/or shape to be used to create the textured wall segment to underlie the image. In other instances, new molds may be required to be made. The site-specific data that has been edited, organized and analyzed through the aid of the data processor 44 can be used to determine whether an existing mold can be used or a new mold needs to be made. If a new mold needs to be made, the detailed information regarding the mold can be sent to or delivered to the appropriate locations for production of the mold. A mold of the predominant textures can be made using a rubber and or silicone mold form. Once appropriate molds are made and selected in 50, the textured wall segments can be formed in the molds. Similarly, the images that have been determined to be used can be sent to and printed on the printer 48. The printing process is described in more detail below.

Figure 3A:
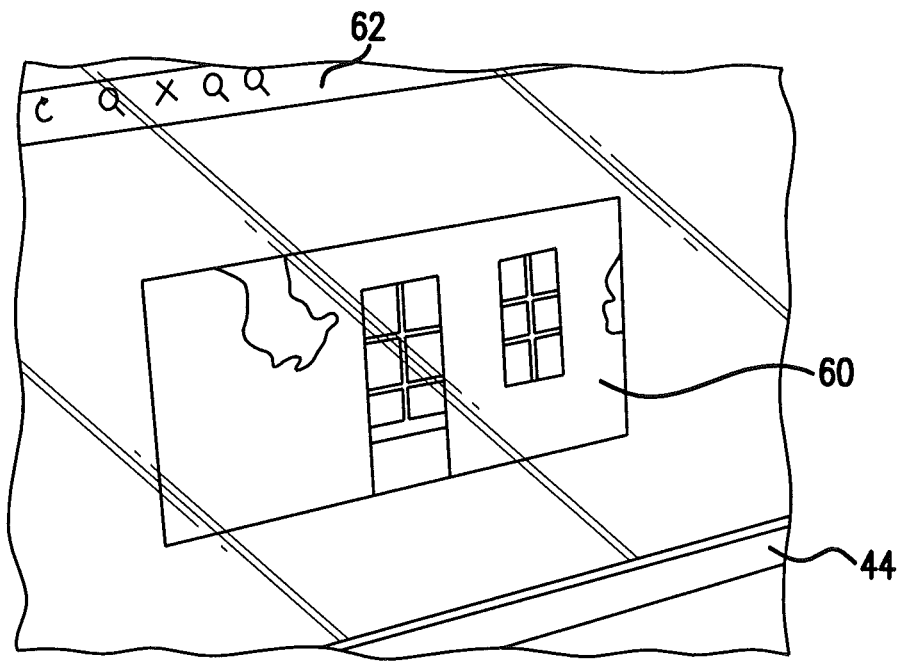
FIGS. 3A-3D illustrate possible steps for creating embodiments of wrapping material panels according to the present subject matter.

As shown in FIG. 3A, the one or more photographic images 60 to be printed can be create, edited, and/or manipulated to obtain the appropriate visual architectural characteristics for the physical simulated structures. The one or more images 60 can be edited and/or manipulated to incorporate the analyzed data that has been collected as shown in FIG. 1D. Suitable high megapixel images can be used if available and/or the intelligence derived in planning the mission site and/or the mission scenario can dictate the photographic images to be used.

For example, the photographic image 60, which can be digital, can be opened on the data processor 44 in the form on a computer in an image-editing program 62 as shown in FIG. 3A so that the digital photographic image 60 can be enhanced and manipulated to create an image that can be printed on panels of the wrapping material used to cover the textured wall segments described above to create appropriate visual architectural characteristics on the structure. The image-editing program can be, for example, PHOTOSHOP® offered by Adobe Systems Incorporated, San Jose Calif. Other image-editing programs can include equivalent photo manipulation and editing software programs such as PAINT.NET® and PICASA®, or the like, or in the case of video footage the image-editing programs can include appropriate video editing software programs that will produce a digital still frame photographic image. Through concepts like vanishing point perspective, a situational realism can be accurately re-created by editing, enhancing, and manipulating the one or more images 60 as needed to reflect appropriate and realistic visual characteristics once printed on the wrapping material that serves as a substrate and can be applied to a physical simulated structure or a textured wall segment.

Once the desired image is confirmed, a proof can be printed to check and see if the appropriate color, clarity, and depth are still being achieved and the image is still an ideal match for the operating environment and the physical simulated structure.

Next, using the image-editing program, the image can be divided into the sections called panels hereinabove. After printing, these panels can fit together overlapping one another when placed on the structure. No registry lines are necessary. The overlapping of the panels can improve seal, adhesion, and installation procedures. The sizes of the panels can depend on the size of the structure to be covered and are only constrained by the cost effectiveness of the selected size, manageability of the installation process, and the printer capabilities. For example, the panels can range from a few square inches to lengths and widths of 100 inches or more.

Once the design is divided into corresponding panels using the image-editing program, the image panels can be printed to a wrapping material substrate. If color, clarity, and depth in the image are achieved, then the panel sections can be saved and sent to a printer 70 (see FIGS. 1D and 3B) to begin the "rip" process of transferring the panel images to the printer and the printer's software. Before the rip process is to begin, another proof can be printed to make sure that nothing has moved or been dropped from the file, if deemed necessary. Once this proof is checked, a test print process of printing an actual panel or a portion of an actual panel on wrapping material can be done, if deemed necessary, to make sure the colors match between the image on the screen of the computer and the image printed on the wrapping material.

Figure 3B:
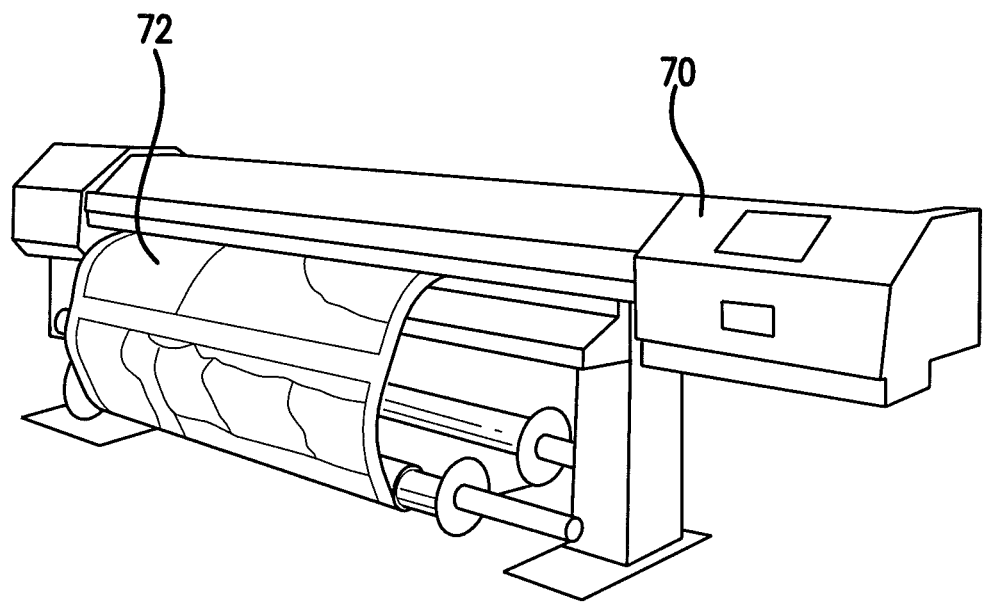

If there is a match or if the check steps are skipped, the printer 70 as shown in FIG. 3B is used to print the necessary panels 72 of wrapping material. The panels 72 of wrapping material can be, for example, a large format graphics medium such as adhesive vinyl graphic film. The printer 70 can be large format printing technology such as large format inkjet printers.

Different sized panels can be used. The number and size of the panels may vary based on the criteria outlined above. In particular, the sizes of the panels can depend on the size and shape of the structure to be covered and are only constrained by the cost effectiveness of the selected size, manageability of the installation process, and the printer capabilities. The size and shape of the wrapping material panels can correspond to the size and shape of the textured wall segments if they are used. In such a manner, the textured wall segments can be installed on a structure after the wrapping material panels are applied thereto. In this manner, the textured wall segments are easily reusable. In such embodiments, the edges of the textured wall segments would need to match without an overlay of wrapping material panels. The selected sizes can assist with the installation process.

Alternatively, the size and shape of the wrapping material panels can be different from the size and shape of the textured wall segments in embodiments where such textured wall segments are used. In such a manner, the textured wall segments can be installed on a structure before the wrapping material panels are applied to the textured wall segments. In such embodiments, the wrapping material can overlay edges or joints between the textured wall segments to conceal such edges and joints.

The wrapping material panels can overlay each other to ensure that they match. The selected sizes can help with manageability and control of the product for the installation crews during the installation process. The selected sizes can promote versatility as some of the installations are done outdoors and some are done indoors. Wind and the elements are also a factor in the installation process.

Figure 3C:
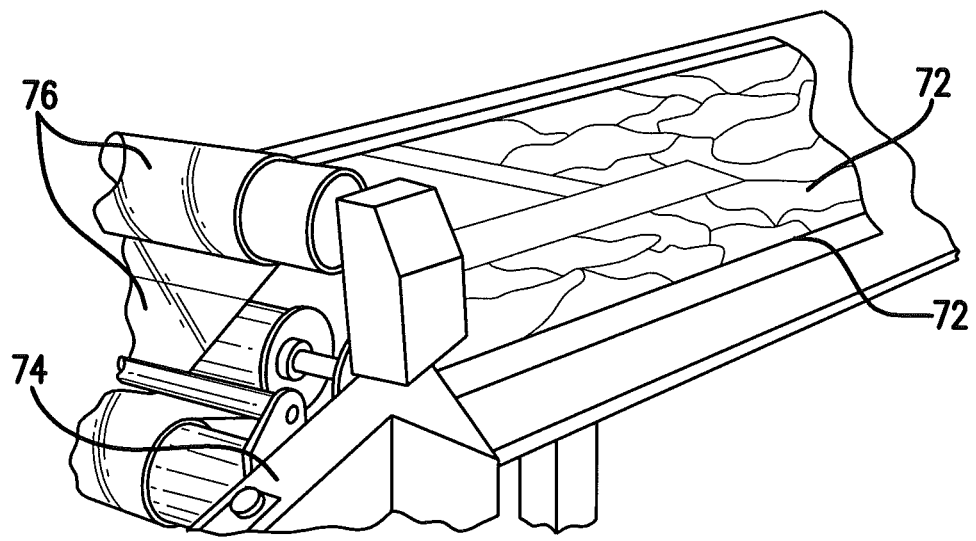

After the photographic image is printed on the wrapping material panel 72, the wrapping material panel 72 can be run through a laminator 74 can apply a laminate layer 76 over the printed surface 72A to protect the printed image and to add other desirable characteristics to the wrapping material panel 72 as shown in FIG. 3C. For example, a protective clear matte over-laminate 76 can be applied to the printed wrapping material panel 72 with the laminator 74 by aligning the laminate layer 76 with the printed wrapping material panel 72 so that the laminate layer 76 overlays the printed surface 72A of the wrapping material panel 72 and applying heat and pressure to the overlaid laminate layer 76 and wrapping panel 72 for protection from elements and to protect the underlying printed image. For example, the wrapping material panel 72 and the laminate layer 76 with the laminate layer 76 aligned with and overlaying the printed surface 72A of the wrapping material panel 72 can be guided through heated and pressurized nip rollers within the laminator 74 to fuse the laminate layer 76 to the wrapping material panel 72.

The wrapping material panel 72 described above can be a thermoplastic film. For example, the wrapping material panel 72 can be a vinyl film such as a polyvinyl chloride film. The type of material and characteristics of the wrapping material panel 72 used can depend on the end use of the textured wall segments that are to be wrapped and the type of structure to which it is applied and the operating environment in which it will be used.

One example of the laminating process is explained in more detail below. Suitable wrapping material can have a protective overcoating laminate layer, like layer 76 described above, laminated thereto that can provide excellent durability and permit quick modification and/or changeability to change the appearance of the structure to which the wrapping material is attached. The durability allows the wrapping material to continue to function in creating visual and situational realism for an extended period of time and under sever weather conditions. The ability to quickly change or modify the appearance of a structure by removal and/or application of the wrapping material is beneficial for modern operational urban training. It permits the same structures to be used to create visually realistic urban settings from different areas or regions of the world in a quick and simple manner.

An example of a thermoplastic film that can be used is a polyvinyl chloride ("PVC") film. The film can be run through a printer to print the portion of the photographic image on the PVC film. For such a film, the conditions in the printing area are preferably controlled. For example, the room temperature and relative humidity can be between about 60° F. to about 90° F. and the relative humidity can be between about 50% to about 90% RH. For instance, the temperature and relative humidity can be about 73° F. (23° C.) and 50% RH when using as a wrapping material a 2.7 mil gloss white, polymeric stabilized, soft calendared PVC film designed for receiving digital ink jet printing. The ink used can be printing inks such as digital printing inks. Different inks can be used to ascertain different properties in the final product. The wrapping material used can be coated on one side with a permanent, opaque, acrylic, pressure sensitive adhesive with air egress technology and supplied with a 80# poly coated liner that is used as a release liner to protect the adhesive until time for application. Table 1 below provides a list of physical properties of an example acrylic adhesive that can be applied to a substrate such as the PVC film described above.

TABLE 1

Properties of an Example Pressure Adhesive

| Physical Properties | Typical Values | Test Method (Federal Test Methods used) |
| --- | --- | --- |
| Peel Adhesion, lb./in. (N/25 mm) 180 degrees on glass - 24 hr | about 3.2-about 4.6 (about 14-20) | FTM-1 |
| Quick Tack on Glass lb./in. (N/25 mm) | about 3.4-about 4.8 (about 15-about 21) | FTM-9 |
| Dimensional Stability, (%) 10" by 10" sample bonded to Aluminum | Maximum of about 0.5 | FTM-14 |
| Normal Application Temperature and | Above about 50° F. (about +10° C.) | |
| Temperature Ranges for Minimum Application | About −40° F. to about 194° F. (about −40° C. to about 90° C.) | |

Once the material is printed, it can be laid on a drying table and left to "gas" or "dry" for a period of about 72 hours to ensure that the ink is dry, if necessary. Once the material has gone through this drying period and depending on the end use of the wrapping material and the structure to which it is to be applied, it can then be laminated in a lamination process to provide an overcoating laminate layer, like layer 76. Laminating a wrapping material like PVC film can add strength and protection to the printed image. For example, a laminate when bonded with the PVC film can provide protection to the image by minimizing the ability to scratch or remove the image from the wrapping material. The laminated wrapping material can also provide protection to a structure on which it is applied. The laminate can also be used to add gloss or a reflection control layer.

The material used in such a lamination process can be a highly conformable cast film, such as a PVC film, that can range in thickness from about 0.5 mm to about 10 mm. For example, highly conformable cast film having a thickness of about 1.5 mm can be used. A cast vinyl laminate can have a built-in ultraviolet protection, be optically clear, and have a low gloss or no-gloss (flat) finish or matte. The laminate can include a permanent adhesive, such as an acrylic adhesive.

The printed wrapping material and the laminate can be run through a lamination process where the adhesive side of the laminate faces the printed side of the wrapping material. The laminate and wrapping material can then pass through pressurized heated or unheated rollers to secure the laminate to the wrapping material. The laminate can be usable in temperatures from about 50° F. to about 225° F. Thus, the laminate can be applied to the wrapping material in hot and cold applications. In the PVC film example, the wrapping material can be left to cool after the material is laminated at about 120° F.

In another example, a 1.5-mil clear matte or a 1.5-mil clear gloss, which are highly conformable cast PVC films, can be chosen as the laminate. The over-laminate film is coated on one side with a clear permanent, acrylic pressure sensitive adhesive and supplied with a 1.2 mil polyester release liner. Upon application, the release liner can be removed. The printed wrapping material and the laminate can be aligned so that the adhesive side of the laminate faces the printed side of the wrapping material. The laminate and wrapping material can then pass through pressurized rollers to secure the laminate to the wrapping material. UV protection can be incorporated into the over-laminating film to help extend the life of the graphic by resisting color fade caused by ultraviolet light.

Once the wrapping material has been created with the image printed thereon, the wrapping material can be applied to a surface on the base structure to be covered. A wrapping material, such as the PVC film described above with its adhesive backing, can be attached to wood, brick, plaster, drywall, stone, steel, rubber, cardboard, particle board, chloroplast or the like where the temperature range and adhesion characteristics are favorable.

Figure 3D:
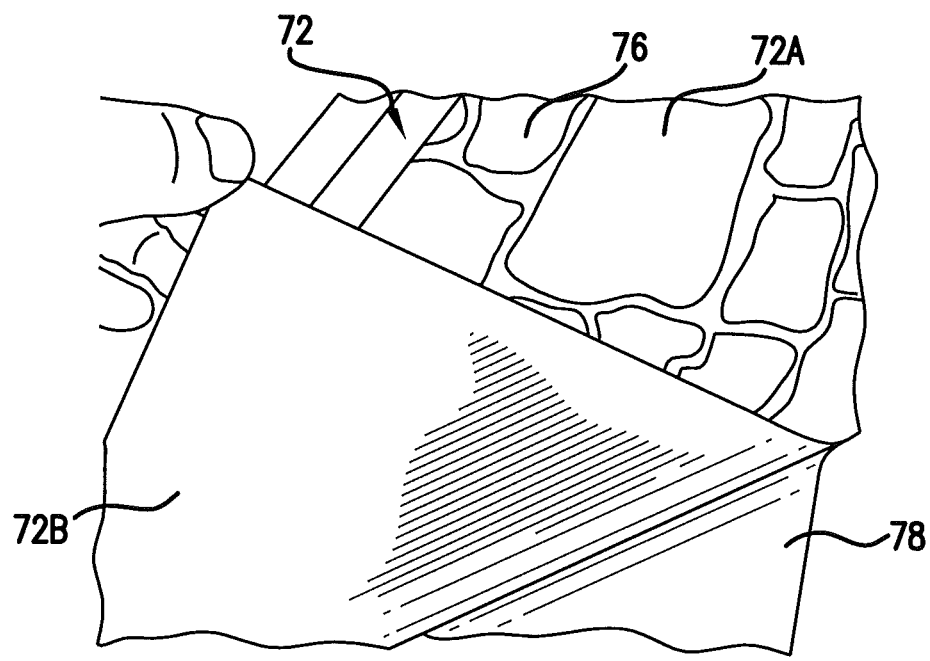

Thus, as shown in FIG. 3D, each wrapping material panel 72 with the printed surface 72A thereon and protected by laminate layer 76 can have a release liner 78 that protects the back surface 72B of the wrapping material panel 72 on which an adhesive can reside. The release liners 78 can be separated from the wrapping material panel 72 to expose the back surface 72B and the adhesive thereon.

Figure 4:
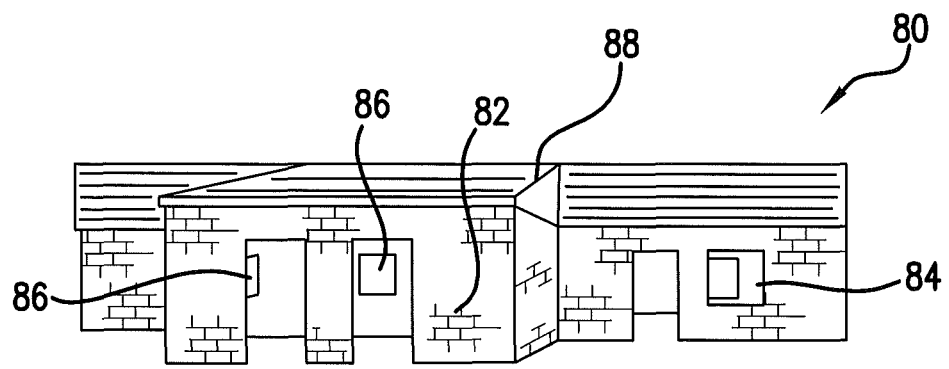
FIGS. 4 and 5 illustrate perspective views of an embodiment of a simulated structure for an immersive training scenario system according to the present subject matter.

FIG. 4 illustrates a physical simulated structure, which in the illustrated embodiment is a typical permanent shoot house generally designated 80, that can be used to help create a realistic immersive training environment that replicates or accurately simulates a mission site. Such a shoot house can be made of modular units as will be described below. Shoot house 80 serves as a base structure and can include ballistic walls 82 in arrangements to resemble a house or other building. Such a shoot house enables military and law enforcement personnel to train in situations in which they face realistic threats to their safety. The shoot house 80 can include windows 84 and doors 86 to further add a more realistic feel.

The ballistic walls 82 of the shoot house 80 can be constructed out of concrete, gravel filled walls, or tire walls. The walls can also be constructed with plates of steel attached together in a ballistically sound manner by facing and backing strips and then covered by a frame. Such a frame typically has two-by-fours attached to the facing strips that hold the plates together, and pieces of plywood that extend between the two-by-fours. A more detailed description of one preferred construction of such ballistic walls is set forth in U.S. Pat. No. 5,822,936, the disclosure of which is incorporated by reference herein in its entirety. Further, a roof generally designated 88 can be added to the shoot house 80. While these shoot houses provided a marked improvement over traditional training at a target range, they still do not feel as realistic as conventional looking walls.

One or more wrapping material panels can be attached to the shoot house 80 to create a more visually realistic looking physical simulated structure. The one or more panels can have at least one site-specific photographic image printed thereon generated by the data processor 44 shown in FIG. 1D that give the shoot house 80 a very realistic look that can reflect the environment for which the training is being conducted. For example, the wrapping material panels, when applied to the shoot house 80, can reflect an actual structure at the mission site in which personnel that are being trained are to be deployed.

Thus, using the data collection and analysis methods and systems description above, a specific building, or structure can be targeted and data about the building can be obtained can be obtained. The site-specific data can be used to create accurate visual imagery using a data processor, such as a computer and an image-editing program, that can printed on one or more wrapping material panels. The panels can then be applied to a surface of a structure, such as the walls of a shoot house, having similar or proportional dimensions to that of the specific building to re-create a situational realism that is unobtainable short of reconstruction of the specific building. Similarly, textural imagery can be used to create textured wall segments as described above that can applied to the building to create a textural component under the panels.

Figure 5:
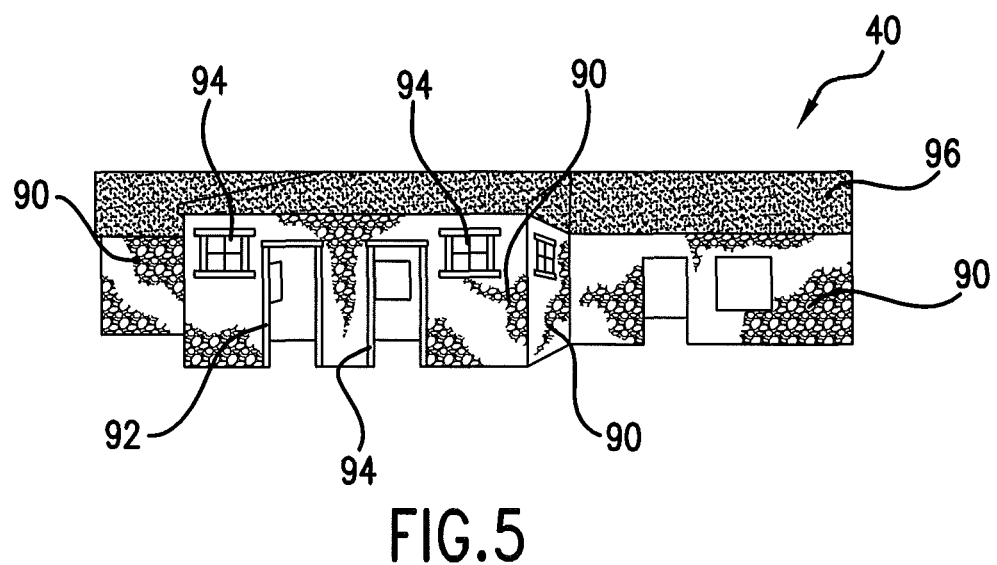

As shown in FIG. 5, the shoot house 80 can have multiple wrapping material panels 90 applied thereto along surfaces, such as the walls 82 (see FIG. 4) of the shoot house 80. The panels 90 have one or more photographic images of a rock wall printed thereon to reflect a Middle Eastern construction style commonly found, for example, in Iraq. The panels 90 can be cut to size to fit the walls 82, leaving space for windows and doors. Other wrapping material panels 92 can be applied over portions of the panels 90 to create door jams that also reflect the selected construction style to add further visual architectural integrity to the shoot house 80. For example, the panels 92 can have a rough hewn wooden door jam printed thereon that can be cut to size and placed around a doorway.

Further, another set of wrapping material panels 94 can be applied over the rock wall panels 90 to create false windows on the shoot house 80. The panels 94 can have a photographic image of a rustic window printed thereon that is architecturally appropriate for the selected construction style. After printing, the panels 94 with the window printed thereon can be cut to the appropriate size and then applied over the rock wall panels 90 at appropriate places. One or more wrapping material panels 96 can also be applied to the roof line 88. The panels 96 can have a photographic image printed thereon that comprises one or more images of a roof line that is architecturally appropriate for the selected construction style. For example, the photographic image printed on the panels 96 can be a thatched roof that might be seen on a rock walled building in the Middle East. As shown in FIGS. 4 and 5, a shoot house can be constructed that provides a realistic visual feel in a quick, effective and inexpensive manner based on the data collection and analysis methods and systems described above.

Figure 6A:
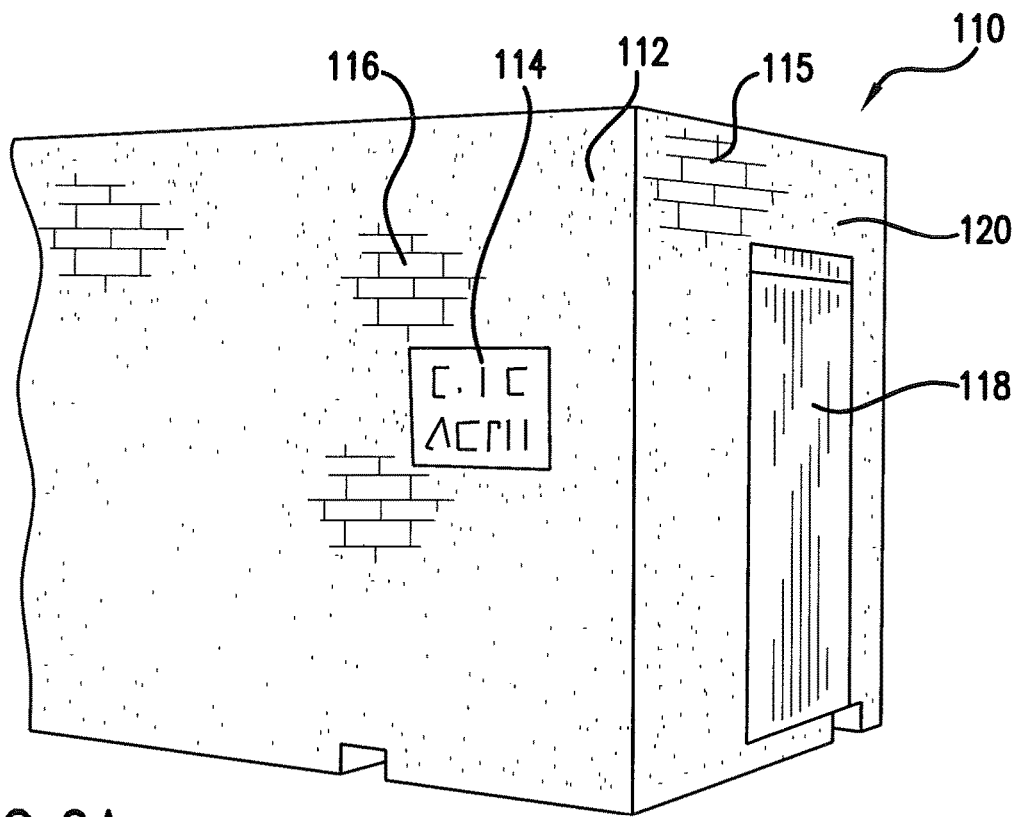
FIGS. 6A and 6B illustrate perspective views of an embodiment of a simulated structure according to the present subject matter.
Figure 6B:
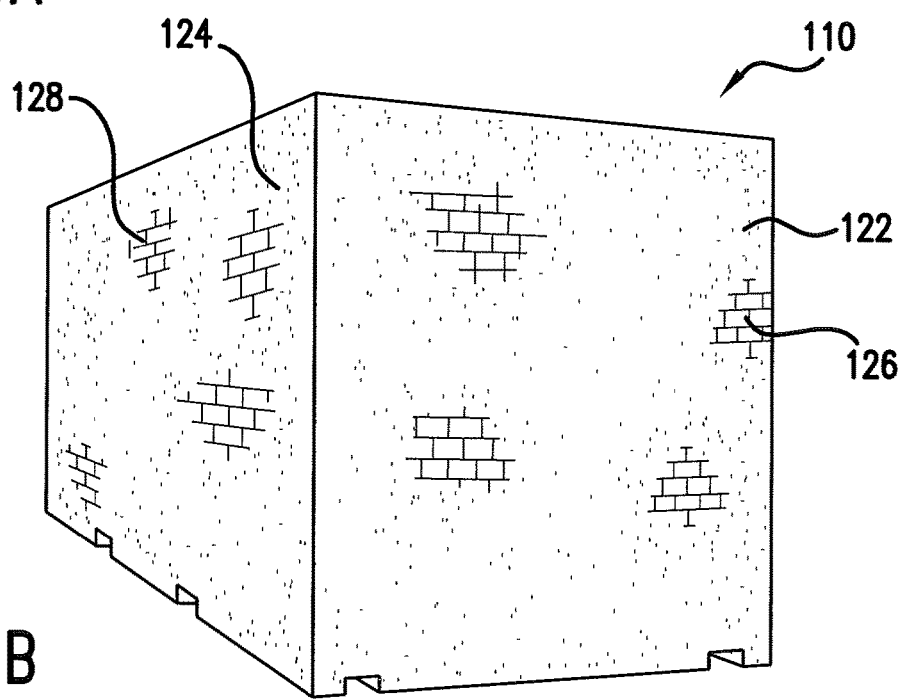

FIGS. 6A and 6B illustrate another physical simulated structure, generally designated 110, that can also be used to help create a realistic immersive training environment that replicates or accurately simulates a mission site. In particular, structure generally designated 110 can be a shipping container, such as a CONEX container, or cargo container, that has been transformed into a modern operational urban training structure by adding realistic detail to the exterior of the container that is specific to the type of training being performed for a specific region or mission site. As described above, the realistic detail comes from intelligence and/or other information collected about the location that is to be simulated or recreated. The information is used to create wall segments that have a texture surface that simulates the outer surface of a structure being simulated or recreated. These textured wall segments can be attached to the exterior walls of the CONEX container (and interior walls of the CONEX container as needed). The information is also used to create imagery that simulates the outer surface of a structure being simulated or recreated, such as photographic and/or computer enhanced images, that are printed on a wrapping material. The wrapping material, such as a polyvinyl chloride film described in more detail below, can be applied in panels over the textured wall segments to add imagery to the texture of the textured wall segments. The wrapping material can be applied to the textured wall segments before or after attachment to the structure 110 such as a shipping container.

Once the textured wall segments are attached to the structure 110 and the textured wall segments wrapped with wrapping material panels as described below, realistic looking façades 112, 115, 122, 124 can be created on all walls 116, 120, 126, 128 of the structure 110 that have realistic detail to enhance the training to be performed. For example, by attachment of the textured wall segments and wrapping material panels, a façade 112 can be created on wall 116 and a façade 115 can created on wall 120 as shown in FIG. 6A. Similarly, a façade 122 can be created on wall 126 and a façade 124 can created on wall 128 as shown in FIG. 6B.

Other architectural and/or decorative features can be added to enhance the facade 112. For example, in the embodiment shown, a sign 114 is added to a side wall 116 and a door 118 is added on a front wall 120. Such added architectural and/or decorative features can be part of the imagery printed on the original wrapping material or can be an application of an additional section of wrapping material. Additionally, the added architectural and/or decorative features can be structural modifications or physical additions to the CONEX container to create the structure 110.

Structure 110 can be a modular unit that can be used singularly or with a plurality of modular units to create a tactical training facility. While shown and described herein as modified shipping containers, such modular units can be any prefabricated structures that are generally interchangeable and can be used with other modular units to assemble a larger structure that is representative of an intended target. For example, the modular units can be specially created modular structures, instead of modified shipping containers. For instance, each modular unit can include interior and exterior panels that consist of standard dimension panels mounted on a grid system, and can include solid panels (single and double sided), window panels, and door panels, with or without breach capabilities. The interior of each modular unit can include bullet containment walls configured to allow live-fire within the modular units. More specifically, the walls in each modular unit can include armored panels and/or armored steel plates to maintain the integrity of the walls when rounds of bullets are shot in the modular units. Alternatively, the modular units can be configured for simulated munitions, such as paintballs. In this embodiment, lightweight walls can be used in place of the bullet containment walls.

To create a quickly convertible façade replication system that is applicable in training for specific scenarios and locations, information and intelligence about the location that is to replicated or simulated must be gathered. Necessary detailed data can be gathered from different sources to create urban mapping and visualization intelligence that can be used to manufacture the façades 112 that can be used to create structures 110 and create a layout of a plurality of such structures 110 that replicates or simulates the geospatial relationships of buildings in an area of intended urban operations.

Figure 7A:
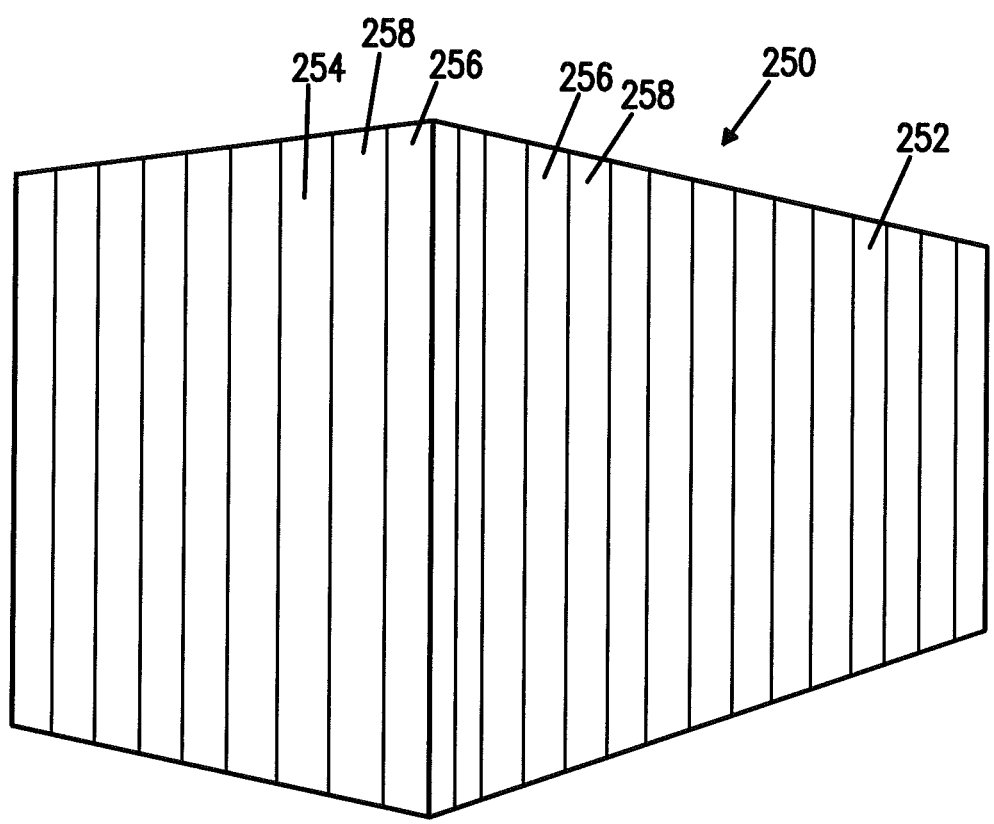
FIGS. 7A-7F illustrates embodiments of steps and components that can be used to replicate a structure to be simulated according to the present subject matter.
Figure 7B:
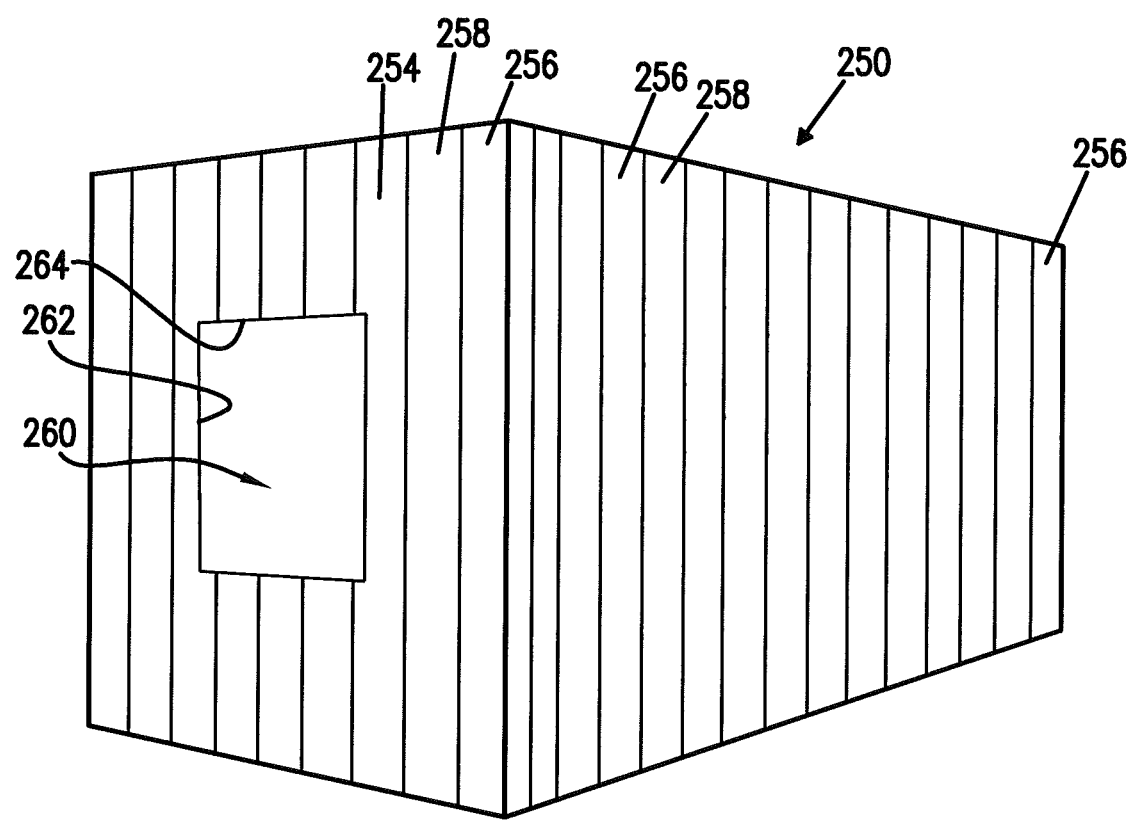
Figure 7C:
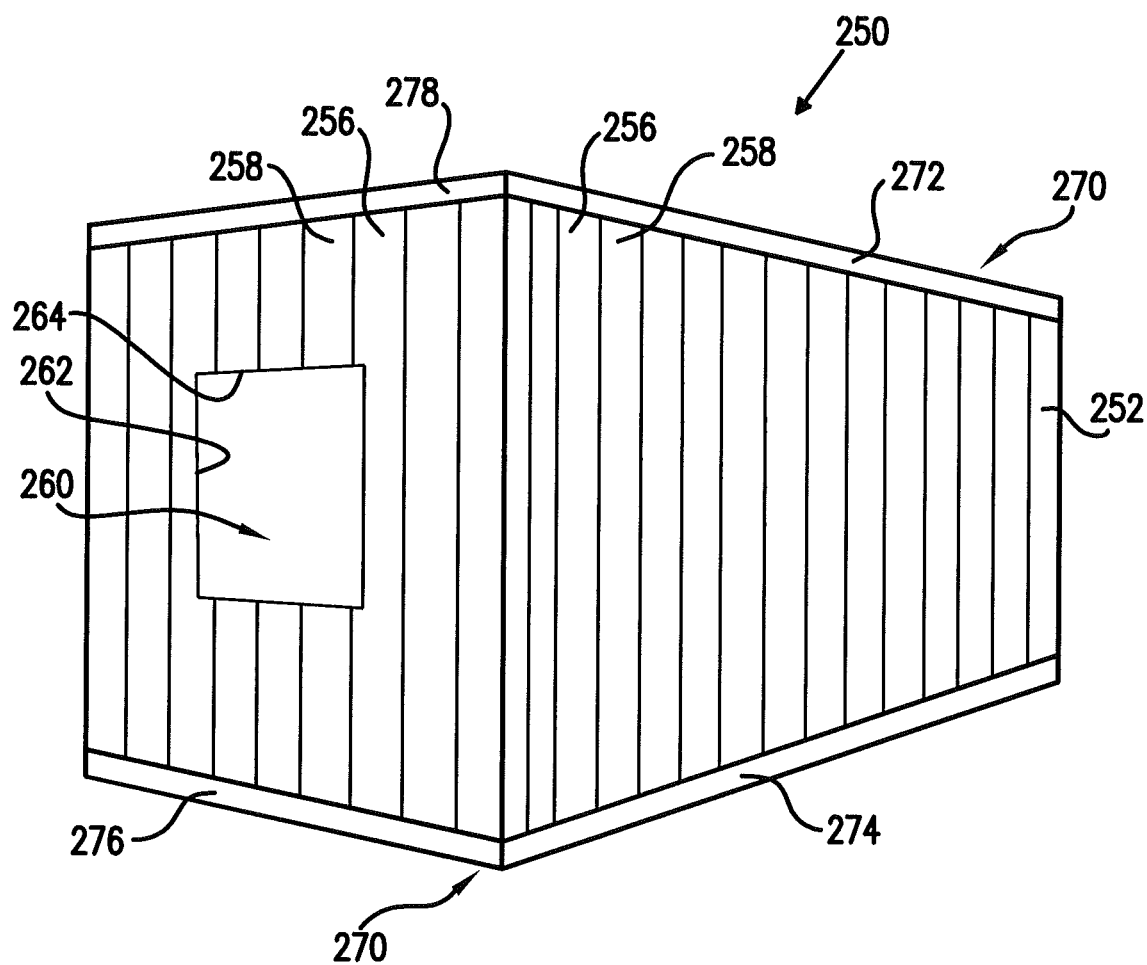
Figure 7D:
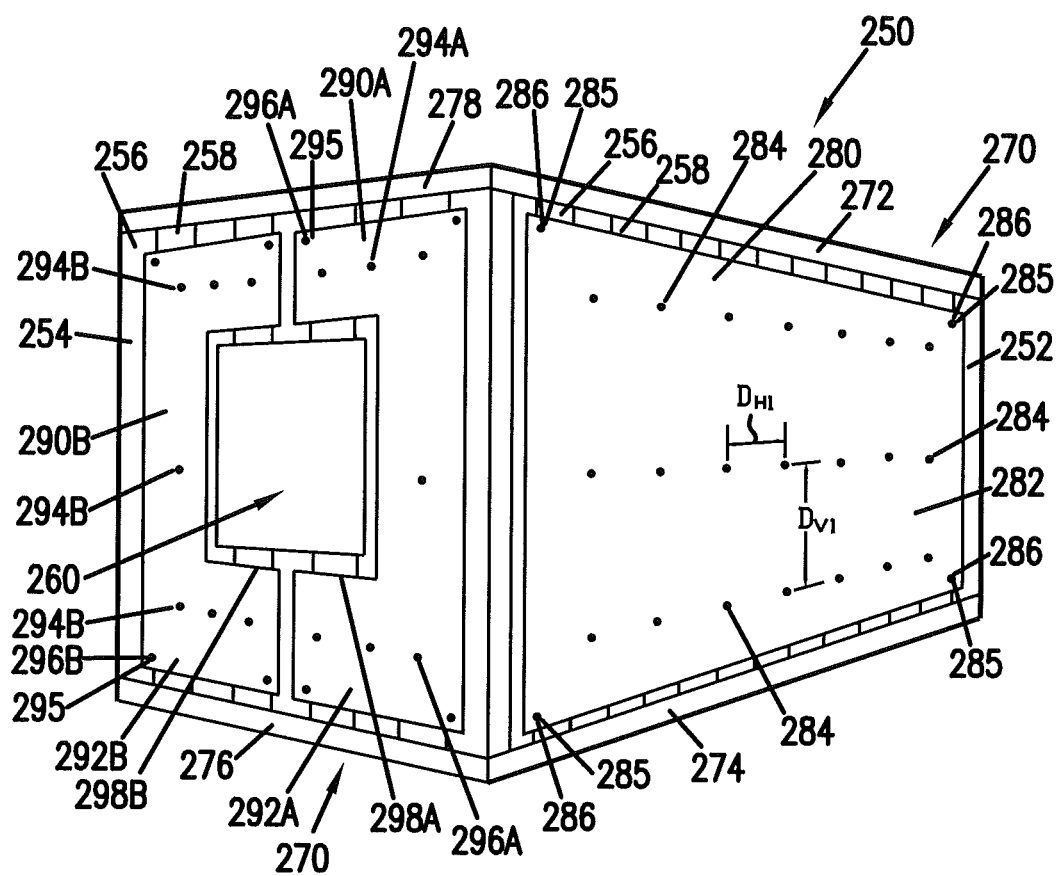

FIGS. 7A-7F illustrate schematics of a further embodiment of an immersive training system and related method. A structure generally designated 250 can be provided as a base structure as shown in FIG. 7A. Structure 250 as a base structure can be for example a shipping container, such as a CONEX container, a permanent shoot house, a portion of a modular unit facility, or the like. The structure 250 can include walls 252 and 254. In the embodiment shown, the walls 252, 254 can be corrugated such that protrusion 256 and indentions 258 are create in a vertical direction along the walls 252, 254. Alternatively, the walls 252, 254 can be flat. Such a structure 250 can be manipulated in different ways to meet the needs of the modern urban operations training for which the structure 250 is to be used. For example, windows and doorways can be created or cut into in the walls of such a structure and if necessary multiple such structures can be linked and or stacked to meet such needs. For instance, as shown in the embodiment, a window generally designated 260 can be cut wall 254. The window can be defined by edges 262, 264 that can be sealed and framed to more accurately depict the mission environment or mission site as needed.

To convert the structure 250 into a modern urban operations training facility, a track system generally designated 270 can be added along one or more walls, for instance, all four walls. For example, an upper track 272 and a lower track 274 can create a portion of the track system 270 along wall 252. For wall 254 of the structure 250, an upper track 278 and lower track 276 can also create a portion of the track system 270 along that wall. The track system 270 can be set up to permit the tracks 272, 274, 276, 278 to receive textured wall segments on at least one end at an entrance (not shown). Inserts (not shown) can be attached at the entrances. The inserts can have width and dimension shapes that can permit the squaring off of the corners of the structure by aligning with insert wall segments. The inserts can then be wrapped with appropriately printed and aligned wrapping panels to seamless conceal the corners of the structure 250.

To facilitate the ability to attach and remove wall segments, securement boards can be attached to the walls of structure 250. For example, a long securement board 280 can be attached to the long wall 252 of structure 250. The long securement board 280 can have board securing apertures 286. Board securing apertures 286 can be used to attach the securement board 280 to the structure 250. The number of board securing apertures 286 can be limited to the number of fasteners needed to securely hold the board 280 and the wall segments to be attached to the structure 250 to withstand the rigors of modern urban operations training.

Thus, the number of fastener members can depend on, for example, the weight of the board 280 and the wall segments to be attached, the strength of the fastener members and the type of training to be performed. In the embodiment shown in FIGS. 7D and 7E, board 280 has four board securing apertures 286, each of which are engaged by a fastener member 285 to secure the board 280 to the structure 250. As with the embodiment of the structure 250 shown where wall 252 is corrugated, the board securing apertures 286 can align with protrusions 256 for easy and more stable attachment.

The long securement board 280 can have segment securing apertures 284 at predetermine locations along the board 280. The segment securing apertures 284 can be equally spaced in a matrix such that each segment securing aperture 284 is spaced at a distance $D_{H1}$ from its immediate horizontal neighbor(s) and is spaced at a distance $D_{V1}$ from its immediate vertical neighbor(s). Thus, with the predetermined location for placement of the fastener members known and having uniform apertures 284 that are dimensioned for easy engagement with fastener members with the securement board 280, the textured wall segments can be more quickly and easily attached and removed from the structure. As with the embodiment of the structure 250 shown where wall 252 is corrugated, the segment securing aperture 284 can align with indentions 258, but are not required to be.

Wall 254 of structure 250 can have two securement boards 290A, 290B to accommodate window 260. As with securement board 280, each securement board 290A, 290B can have respective segment securing apertures 294A, 294B at predetermine locations along each board 290A, 290B. Board securing apertures 296A, 296B can be used to attach the securement boards 290A, 290B to the structures. To further accommodate for the inclusion of window 260 in the structure 250, each securement board 290A, 290B can include a respective recess 298A, 298B. In this manner, the wall segments attached around the top and bottom of the window can be better secured.

Figure 7E:
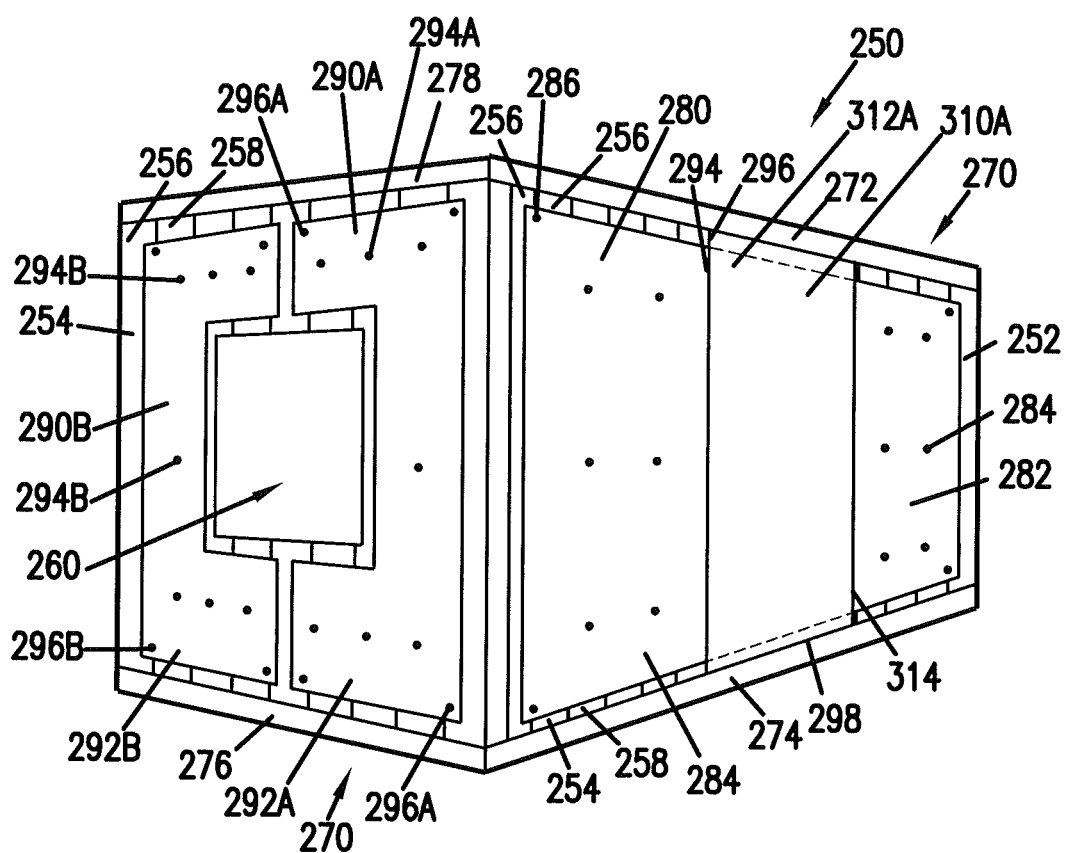
Figure 7F:
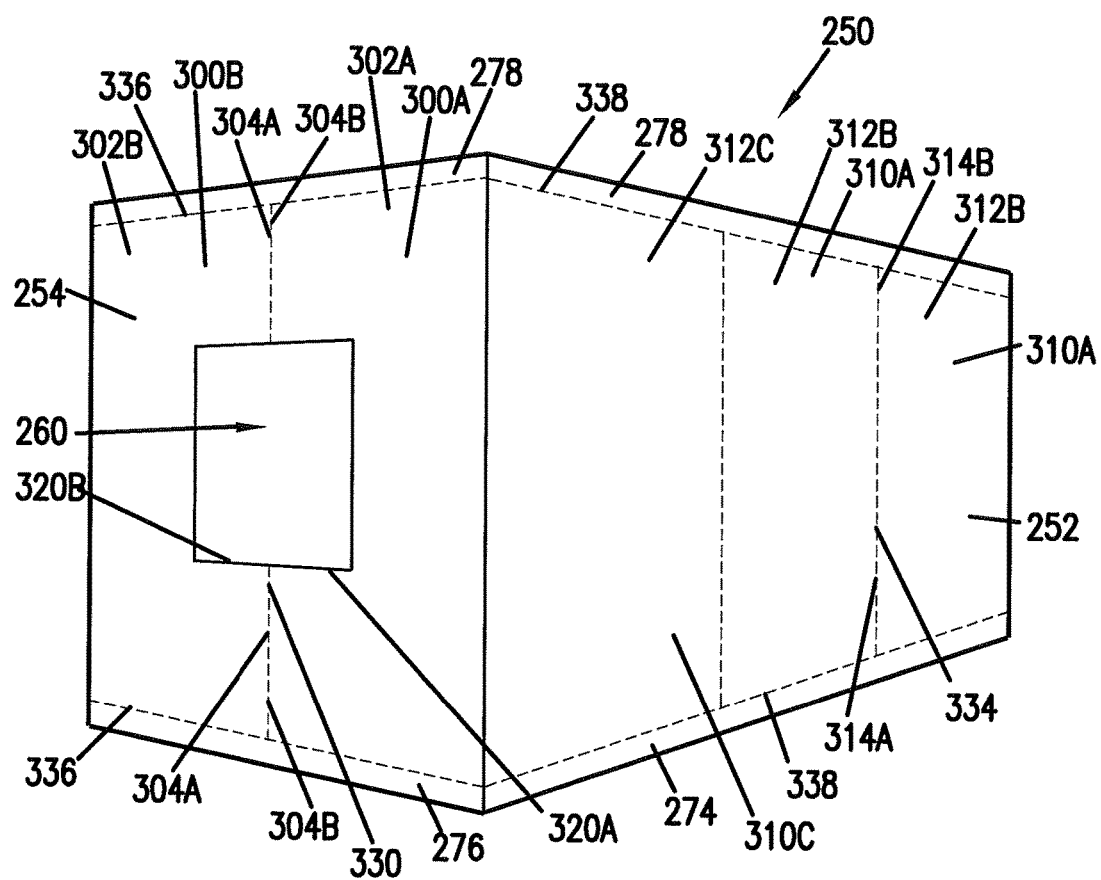

As shown in FIGS. 7E and 7F, wall segments 310A, 310B and 310C can be inserted into the tracks 272, 274 of track system 270 to form a façade along wall 252. After insertion and proper alignment of wall segment 310A, 310B, 310C, wall segments 310A, 310B, 310C can be secured to securement board 280. Each wall segment 310A, 310B, 310C can include imagery on its respective outer surface 312A, 312B, 312C as described above that when aligned creates a full coherent image of the façade. For example, the edge 314A of wall segment 310A can abut with the edge 314B of wall segment 310B so that the imagery on outer surface 312A can aligns with imagery on outer surface 312B to make a generally continuous image. The number of wall segments 310A, 310B, 310C can be varied depending on the size of the wall segments and the size of the structure 250.

Similarly, wall segments 300A and 300B can be inserted into the tracks 276, 278 of track system 270 to form a façade along wall 254. After insertion and proper alignment of wall segment 300A, 300B, wall segments 300A, 300B can be secured to the respective securement boards 290A, 290B. Each wall segment 300A, 300B can include a respective recess 298A, 298B to accommodate for the inclusion of window 260 in the structure 250. Each wall segment 300A, 300B can include imagery on its respective outer surface 302A, 302B that when aligned creates a full coherent image of the façade on wall 254 of structure 250. For example, the edge 304A of wall segment 300A can abut with the edge 304B of wall segment 300B so that the imagery on outer surface 302A can aligns with imagery on outer surface 302B to make a generally continuous image.

As needed or desired, seams 330, 334 formed where wall segments 300A, 300B, 310A, 310B, 310C abut against each other and seams 336, 338 formed between where wall segments 300A, 300B, 310A, 310B, 310C and the tracks 272, 274, 276, 278 of track system 270 can be painted or covered by appropriate sized wrapping material panels with proper imagery printed thereon to conceal these seams.

Figure 8:
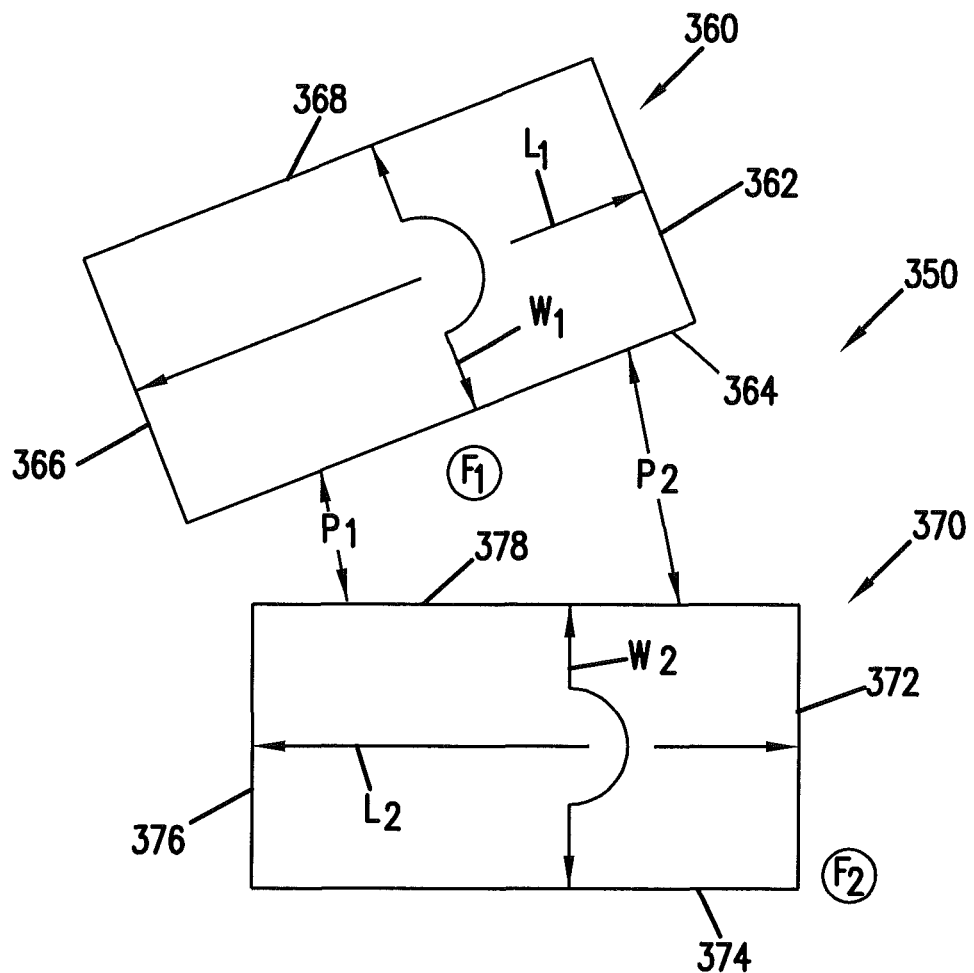
FIG. 8 illustrates a simple schematic of an embodiment of realistic immersive training environment that simulates a mission site according to the present subject matter.

FIG. 8 illustrates a realistic immersive training environment generally designated 350 that can be created using data collection and manipulation processes and systems for three-dimensional virtual simulations of the mission site described above. Based on the site-specific data collected for and/or from a mission site that is manipulated and analyzed as described above, the realistic immersive training environment 350 can include many features and details that the actual mission site has to provide an immersive environment for enhanced training. The realistic immersive training environment 300 can include physical simulated structures generally designated 360 and 370 that have the same dimensions on the interior and exterior of structures such as buildings or walls at the mission site. Additional features, such as features $F_1$ and $F_2$ that can be terrain features like bushed, trees, holes, or the like, can be positioned at locations relative to the physical simulated structures 360 and 370 as such similar features are located relative to the structures at the mission site.

For example, structure 360 can have visual and/or textural imagery secured to walls 362, 364, 366, 368 to create a façade that contains many details of the outer surfaces of the structure at the mission site that is being simulated, or replicated. Similarly, the interior and exterior dimensions of the structure 360 can be about the same as the dimensions of the structure at the mission site that is being simulated. For example, the structure 360 can have an interior length dimension $L_1$ that is the same as the interior length dimension of the structure at the mission site to be simulated and an interior width dimension $W_1$ that is the same as the interior width dimension of the structure at the mission site to be simulated.

Similarly, structure 370 can have visual and/or textural imagery secured to walls 372, 374, 376, 378 to create a façade that contains many details of the outer surfaces of the structure at the mission site that is being simulated, or replicated. Similarly, the interior and exterior dimensions of the structure 370 can be about the same as the dimensions of the structure at the mission site that is being simulated. For example, the structure 370 can have an interior length dimension $L_2$ that is the same as the interior length dimension of the structure at the mission site to be simulated and an interior width dimension $W_2$ that is the same as the interior width dimension of the structure at the mission site to be simulated.

Further, the structures 360, 370 can be positioned relative to each other in the same positions that the structures at the mission site that are being simulated. For example, a first end of the structure 360 can be positioned at a distance $P_1$ from a first end of the structure 370 and second end of the structure 360 can be positioned at a distance $P_2$ from a second end of the structure 370. The distance $P_1$ can be the same distance between the first ends of the structures being simulated and the distance $P_2$ can be the same distance between the second ends of the structures being simulated. In this manner, arealistic immersive training environment that accurately simulates a mission site can be created.

Such structures as simulated structures 80, 110, and 250 can be arranged into a grouping of buildings to provide a comprehensive immersive training environment. These groupings can be arranged to simulate villages or sections of a city for training military, law enforcement or first responder personnel. Such groupings can be used in training mounted (i.e., residing on a vehicle) or dismounted personnel. The number of simulated structures in a grouping can range from 1 simulated structure to over 400 simulated structures. Further, the number of personnel trained in such groupings of simulated structures can range from 1 personnel to over 4,000 personnel. For example, a brigade combat team of the U.S Army can train in such a grouping of simulated structures. In one embodiment, such a grouping of simulated structures can be arranged as a village in central Iraq for the purpose of realistic counter-IED training.

Through the structures, systems and processes described above, situational realism is created by replicating or accurately simulating structures at mission sites and environments through the use of a variety of data to create urban mapping and visualization intelligence. The urban mapping and visualization intelligence can be used to accurate create facades and imagery for structures that create visual and textural realism for the structures used in the training. Additionally, systems and processes described above can be used to permit quick convertible ability of structures to immersive training structures through attachment of facades in quick and easy manners. These structures, systems and processes allow the replication of an operational environment for a realistic training and mission rehearsal environment.

The realistic immersive training environments can be physically built, full-scale physical simulations of buildings, structures or objects found in a precise geographic location at the mission site. The realistic immersive training environments were developed for the purpose of geo-specific, i.e., site-specific, highly accurate three-dimensional immersion. The realistic immersive training environments can exist as both scale accurate three-dimensional computer virtual simulations, as well as physical simulations that include full-scale construction duplications in the form of physical simulated structures (although the structures themselves may be built from shipping containers beneath their facade of wrapping material panels and/or textured wall segments). The virtual simulations of realistic immersive training environments can provide a means of authentically replicating or simulating a precise geographic location for visualizing, simulating, and/or verifying in three-dimensions the authenticity of the environment, so as to gauge the realism-prior to physically building the replicated environment.

Embodiments of the present disclosure shown in the drawings and described above are exemplary of numerous embodiments that can be made within the scope of the appending claims. It is contemplated that the configurations of the immersive training scenario systems and related methods for making the same can comprise numerous configurations other than those specifically disclosed. The scope of a patent issuing from this disclosure will be defined by these appending claims.

What is claimed is:

1. A system for creating an immersive training environment for urban operations training that simulates a mission site, the system comprising:

one or more data collection apparatuses for collecting site-specific data specific for a mission site to be simulated;

a computer for reviewing data from the site-specific data and generating three-dimensional virtual simulations of the mission site that can provide an accurate depiction of the mission site and generating visual imagery for one or more physical simulated structures in which a trainee can train based on the three-dimensional virtual simulations, the one or more physical simulated structures to represent one or more structures at the mission site to be simulated;

one or more wall segments that have a textured outer surface to reflect a texture of an outer surface of the one or more structures at the mission site to be simulated, the one or more wall segments for attachment to the one or more physical simulated structures; and one or more wrapping material panels with the visual imagery generated by the computer printed thereon for application to the outer textured surface of the one or more wall segments so that when the one or more wall segments are attached to the one or more physical simulated structures, the one or more physical simulated structures have realistic visual characteristics representative of a mission site or a mission scenario.

2. The system according to claim 1, wherein the one or more data collection apparatuses comprise at least one of a camera, a radar device, a light detection and ranging device ("LIDAR"), a sonar device, a global positioning system device ("GPS"), or a differential global positioning system device ("DGPS").

3. The system according to claim 2, wherein the one or more data collection apparatuses and the computer are combined together in a mobile device.

4. The system according to claim 1, wherein an accuracy of depictions of one or more structures at the mission site to be simulated by the visual imagery is based on a redundancy of data found in the site-specific data collected and analyzed.

5. The system according to claim 1, further comprising one or more physical simulated structures on which the one or more wall segments are attached with the wrapping material panels that have the visual imagery thereon applied to the one or more wall segments to create physical simulations of one or more structures of the mission site to be simulated in which trainees can train.

6. The system according to claim 1, wherein the computer generates accurate textural imagery of the one or more structure at the mission site to be simulated based on the analysis of the site-specific data.

7. The system according to claim 6, wherein the one or more wall segments have a textured outer surface based on the generated textural imagery that reflects the texture of an outer surface of the one or more structures at the mission site to be simulated.

8. The system according to claim 1, wherein details in the visual imagery printed on the one or more wrapping material panels are alignable with corresponding textures in the textured outer surface of the one or more wall segments.

9. The system according to claim 5, wherein the one or more physical simulated structures comprise one or more shipping containers comprising corrugated walls and the one or more wall segments are configured to cover the corrugated walls of the one or more shipping containers.

10. The system according to claim 9, wherein the one or more wall segments comprise protrusions and indentions on a back side of the one or more wall segments that faces the corrugated walls of the shipping container so that the protrusions and indentions on the back side of the one or more wall segments are engagable with protrusions and indentions of the corrugated walls of the shipping container.

11. The structure according to claim 9, further comprising securement boards being attachable to the corrugated walls of the shipping container with the one or more wall segments being securable to the securement board.

12. The system according to claim 1, wherein the three-dimensional virtual simulation is used to determine the placement of the one or more physical simulated structures relative to one another.

* * * * *